(12) United States Patent
Chakankar et al.

(10) Patent No.: US 10,776,213 B2
(45) Date of Patent: Sep. 15, 2020

(54) RESTORING A DATABASE USING A FULLY HYDRATED BACKUP

(71) Applicant: Cohesity, Inc., Santa Clara, CA (US)

(72) Inventors: Abhijit Chakankar, San Jose, CA (US); Warren Shen, Sunnyvale, CA (US); Manoj Singhal, Sunnyvale, CA (US)

(73) Assignee: Cohesity, Inc., San Jose, CA (US)

( * ) Notice: Subject to any disclaimer, the term of this patent is extended or adjusted under 35 U.S.C. 154(b) by 419 days.

(21) Appl. No.: 15/693,013

(22) Filed: Aug. 31, 2017

(65) Prior Publication Data
US 2019/0065322 A1 Feb. 28, 2019

(51) Int. Cl.
G06F 11/14 (2006.01)
G06F 3/06 (2006.01)
G06F 16/11 (2019.01)
G06F 16/27 (2019.01)

(52) U.S. Cl.
CPC ........ *G06F 11/1451* (2013.01); *G06F 3/0619* (2013.01); *G06F 3/0665* (2013.01); *G06F 3/0689* (2013.01); *G06F 11/1464* (2013.01); *G06F 11/1471* (2013.01); *G06F 16/128* (2019.01); *G06F 16/27* (2019.01); *G06F 2201/84* (2013.01)

(58) Field of Classification Search
CPC .. G06F 9/5088; G06F 11/1451; G06F 16/128; G06F 16/27
See application file for complete search history.

(56) References Cited

U.S. PATENT DOCUMENTS

| | | | |
|---|---|---|---|
| 6,823,436 B2* | 11/2004 | Krishnamurthy | G06F 3/0601 711/170 |
| 7,373,364 B1 | 5/2008 | Chapman | |
| 7,523,277 B1* | 4/2009 | Kekre | G06F 11/1666 711/162 |
| 7,873,601 B1 | 1/2011 | Kushwah | |
| 8,782,006 B1* | 7/2014 | Ou | G06F 11/1456 707/641 |
| 8,943,282 B1* | 1/2015 | Armangau | G06F 16/128 711/162 |
| 9,015,123 B1* | 4/2015 | Mathew | G06F 16/178 707/646 |
| 9,235,479 B1* | 1/2016 | Muntz | G06F 11/1458 |
| 9,811,542 B1* | 11/2017 | Payne | G06F 16/21 |
| 2003/0093443 A1* | 5/2003 | Huxoll | G06F 11/1466 |
| 2014/0149698 A1* | 5/2014 | Ezra | G06F 3/0614 711/162 |
| 2015/0142745 A1* | 5/2015 | Tekade | G06F 11/1451 707/646 |
| 2015/0370502 A1 | 12/2015 | Aron | |

(Continued)

*Primary Examiner* — Loc Tran
(74) *Attorney, Agent, or Firm* — Van Pelt, Yi & James LLP

(57) ABSTRACT

A backup of a database is determined to be performed. A backup of at least a portion of contents of a storage volume that includes data of the database is performed. The backup includes a step of creating a new metadata tree root node. Creating the new metadata tree root node includes copying from another metadata tree root node of a tree data structure corresponding to a previous backup instance, one or more references to one or more lower tier metadata tree nodes associated with the tree data structure corresponding to the previous backup instance.

16 Claims, 15 Drawing Sheets

(56) References Cited

U.S. PATENT DOCUMENTS

| | | | |
|---|---|---|---|
| 2016/0034356 A1* | 2/2016 | Aron | G06F 11/1435 |
| | | | 707/649 |
| 2016/0147614 A1* | 5/2016 | Mittal | G06F 16/273 |
| | | | 707/615 |
| 2016/0321145 A1* | 11/2016 | Fang | G06F 11/1471 |
| 2016/0342484 A1* | 11/2016 | French | G06F 11/1469 |
| 2017/0031774 A1* | 2/2017 | Bolen | G06F 11/1458 |
| 2017/0060449 A1* | 3/2017 | Zucca | G06F 11/1448 |
| 2017/0132266 A1* | 5/2017 | Bell | H04L 9/0861 |
| 2017/0344590 A1* | 11/2017 | Aron | G06F 16/2246 |
| 2018/0096017 A1* | 4/2018 | Dean | H04L 67/1097 |
| 2019/0034507 A1* | 1/2019 | Duttagupta | G06F 16/2246 |

\* cited by examiner

RESTORING A DATABASE USING A FULLY HYDRATED BACKUP

BACKGROUND OF THE INVENTION

A snapshot can be created to capture a state of a database at a particular point in time. A full snapshot of a system may be composed of large amounts of data (e.g., terabytes, petabytes, etc.). Performing a full snapshot of a database at frequent intervals (e.g., hourly, daily) requires large amounts of storage to store the snapshots. To reduce the amount of storage required, an incremental snapshot of the database may be performed between full snapshots. An incremental snapshot includes the changes that have occurred to the system since the previous (full or incremental) snapshot. However, restoring a database using a full snapshot and several incremental snapshots may require large amounts of storage and consume large amounts of computational resources and time to perform.

For example, suppose a full snapshot of a database comprised of 1 TB of data was performed at t=0 and an incremental snapshot of 100 GB of data was performed at each t, from t=1 to t=10. Some of the data from an incremental snapshot may overwrite the data from the full snapshot and/or a previous incremental snapshot. However, to recover a database at t=10 requires starting from the full snapshot at t=0 and applying changes captured at each incremental snapshot to the system until the combined snapshots reproduce the state of the database at t=10.

Although the above process reduces the amount of storage required to store the backup data as compared to continually capturing full snapshots, it increases the amount of computational resources and time needed to recover the data. It would be useful to not only minimize the amount of storage required to store the data, but also to reduce the amount of computational resources and time needed to recover data.

BRIEF DESCRIPTION OF THE DRAWINGS

Various embodiments of the invention are disclosed in the following detailed description and the accompanying drawings.

DETAILED DESCRIPTION

Figure 1:
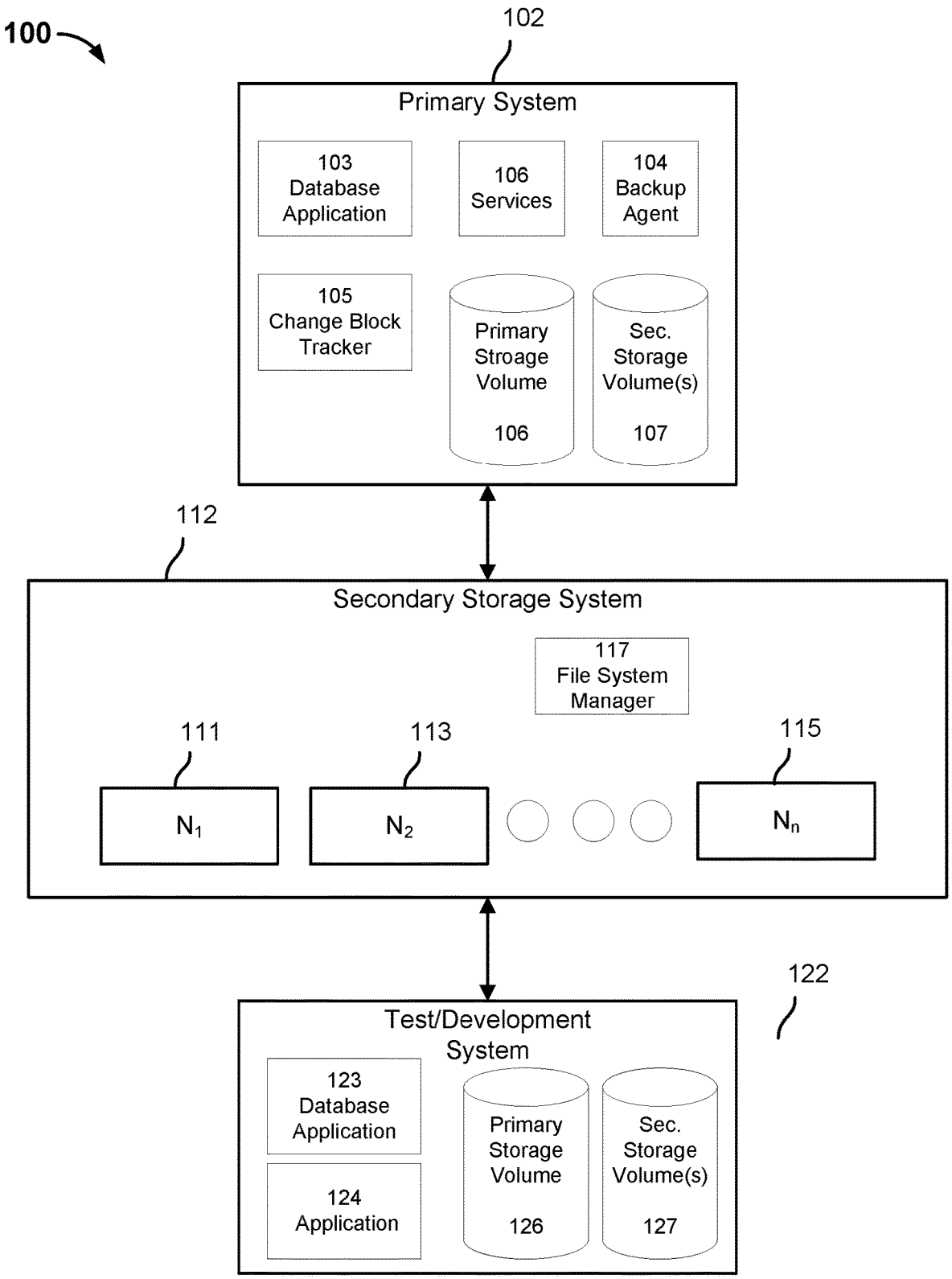
FIG. 1 is a block diagram illustrating an embodiment of a system for generating fully hydrated backups.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Fully hydrated backups are disclosed. A fully hydrated backup is a backup that is almost instantaneously accessible (e.g., a few seconds) that does not require rehydration. A fully hydrated backup may provide a complete view of a storage volume, regardless if the backup is a full backup or an incremental backup. Typical database backups include a full backup daisy chained to one or more incremental backups. As more and more incremental backups become daisy chained to the full backup, a lot of computation resources and time are required to recover the database.

A primary system may be used to implement a database application (e.g., SQL Server) and store one or more database files and one or more associated transaction log file segments to the one or more storage volumes of the primary system. The primary system may perform a backup of the one or more storage volumes to a secondary storage system. The backup may be initiated by a backup agent running on the primary system. Instead of only backing up the data associated with a database application, the complete storage volume on which the data associated with the database application resides, may be backed up. A backup command from the backup agent may cause the database application to quiesce the database and to record the metadata associated with the database (e.g., log sequence numbers (LSN), one or more file names, a creation date, offline/online status, etc.). Quiescing the database before performing a backup ensures that the database is in a consistent state prior to backup.

The backup may be a full backup or an incremental backup. Each storage volume of the primary system is comprised of data. A full backup includes a copy of the entire data content to be backup protected (e.g., all data of a storage volume to be protected are copied to create the full backup). An incremental backup saves storage space as compared to the full backup by identifying and storing data changes since a previous backup (e.g., in creating the incremental backup only perform a copy of data that is new or have changed since the previous backup). In some embodiments, by using a file system metadata snapshot tree, incremental backups are stored in a fully-hydrated manner that allows an incremental backup to be directly utilized much like a full backup to directly provide a complete view and access to protected data without the need to hydrate the incremental backup or access/combine with a previous full backup. For example, for a desired data not captured in an incremental backup because it was unchanged from a previous backup, the file system metadata snapshot tree corresponding to the incremental backup is created in a manner to store a link to an appropriate data portion of the previous backup that can be used to directly access the desired data.

Data for the backup may be received at a secondary storage system. The backup may be comprised of a copy of one or more files associated with database, one or more files associated with metadata of the copied storage volume(s), and/or one or more non-database files. The secondary storage system may create a file system metadata snapshot tree for the backup. The file system metadata snapshot tree for the backup corresponds to a version of the storage volume(s) at a particular moment in time. The secondary storage system may also create a file snapshot tree for each file included in the backup. The file snapshot tree may store the contents of a file and/or metadata specific to the file. A leaf node of the file system metadata snapshot tree may include a pointer to one of the file snapshot trees, linking the contents of a file to the file system metadata snapshot tree. The plurality of files associated with the database and the database metadata represent a state of the database at a particular point in time.

A file system metadata snapshot tree is a tree data structure and is comprised of a root node, one or more levels of intermediate nodes, and one or more leaf nodes. In some embodiments, a file system metadata snapshot tree is comprised of a root node and one or more leaf nodes. The root node is the starting point of a file system metadata snapshot tree and may include pointers to one or more other nodes. The root node includes an identifier that indicates a view with which the root node is associated. An intermediate node is a node to which another node points (e.g., root node, other intermediate node) and includes one or more pointers to other nodes. A leaf node is a node at the bottom of a file system metadata snapshot tree. In some embodiments, a leaf node is configured to store key-value pairs of file system metadata associated with the storage volume(s). In some embodiments, a leaf node is configured to store key-value pairs of data associated with the database. In some embodiments, a leaf node is configured to store key-value pairs of non-database data. In some embodiments, a leaf node includes a pointer to a file snapshot tree. The file snapshot tree may be a subtree of the file system metadata snapshot tree. For example, a leaf node of a file system metadata snapshot tree storing metadata associated with the storage volume(s) may include a pointer to a root node of a file snapshot tree storing data associated with the database. In some embodiments, a leaf node of a file system metadata snapshot tree or a leaf node of a file snapshot tree includes a pointer to a physical location storing data. Each node of the tree structure includes an identifier of a snapshot tree that identifies a snapshot tree (file system metadata snapshot tree or file snapshot tree) with which the node is associated (e.g., TreeID).

The tree data structure may be used to capture different versions of the storage volume(s) at different moments in time. A backup received from a primary system may include data associated with a first version of the storage volume(s) at a first point in time and a subsequent backup received from the primary system may include data associated with the second version of the storage volume(s) at a second point in time. Each version of the volume(s) may be represented in a corresponding file system metadata snapshot tree. The tree data structure allows a chain of file system metadata snapshot trees (i.e., each corresponding file system metadata snapshot tree) to be linked together by allowing a node of a later version of a file system metadata snapshot tree corresponding to a later version of the storage volume(s) to reference a node of a previous version of the file system metadata snapshot tree corresponding to an earlier version of the storage volume(s). The tree data structure allows a chain of file snapshot trees (i.e., each corresponding file snapshot tree) to be linked together by allowing a node of a later version of a file snapshot tree corresponding to a later version of a file to reference a node of a previous version of the file snapshot tree corresponding to an earlier version of the file.

Each time data for an incremental backup of the storage volume(s) is received, a new file system metadata snapshot tree is added to the corresponding tree data structure by creating a new root node. The new root node may be a copy of the root node associated with a previous file system metadata snapshot tree. Initially upon creation, the new root node includes the set of pointers included in the previous root node, that is, the new root node includes one or more pointers to an intermediate node or leaf node that was specified in the root node of a previous file system metadata snapshot tree associated with a previous backup. However, among other differences, the new root node includes a node identifier and a view identifier that is different than the node identifier and view identifier of the previous root node. The new file system metadata snapshot tree may be modified to reflect the data included in the backup of the storage volume(s) (e.g., adding one or more intermediate nodes, adding one or more leaf nodes, updating pointers associated with nodes).

A file system metadata snapshot tree is a representation of a fully hydrated backup because it provides a complete view of the storage volume(s) at a particular moment in time. Any file stored in the storage volume at a particular time and the file's contents, for which there is an associated backup, may be determined from the file system metadata snapshot tree, regardless if the associated backup was a full backup or an incremental backup. Creating an incremental backup may only include copying data of the storage volume(s) that was not previously backed up. However, the file system metadata snapshot tree corresponding to the incremental backup provides a complete view of the storage volume(s) at the particular moment in time because it includes references to data of the storage volume that was previously stored. This provides significant savings in the amount of time needed to restore or recover a storage volume and/or a database. In contrast, traditional recovery/restoration methods mount a full backup and the entirety of one or more subsequent incremental backups to create the particular version of the volume and/or database. The file system metadata snapshot tree also enables efficient retrieval of data values because each leaf node is the same number of levels away from the root node of the file system metadata snapshot tree, that is, the same number of computer transactions are used to access each leaf node of the file system metadata snapshot tree.

A fully hydrated database backup enables database restore, recovery, and cloning workflows to occur almost instantaneously (e.g., seconds) instead of taking a long period of time (e.g., hours) to perform. For example, a version of a database may be recovered to a specified location, a version of a database may be cloned to allow a testing/development system to make one or more database queries and/or test one or more changes to the database, or an entire virtual machine and a database may be restored to any particular point in time and copied to a specified location for disaster recovery or testing/development purposes.

A version of a database may be recovered to a specified location. The specified location may be the primary system that created the version of the database or a different system. A file system metadata snapshot tree corresponding to the version of the database to be recovered is identified. Metadata associated with the database may indicate one or more files associated with the version of the database to be recovered. Metadata associated with the database may indicate the file system metadata snapshot tree corresponding to the version of the database to be recovered. A copy of the file system metadata snapshot tree corresponding to the version of the database to be recovered is created. The storage system may implement a retention policy to delete backup data after a certain period of time of the data creation date (e.g., 30 days). This may cause backup data being used to perform a database recovery to expire in the middle of the database recovery. Creating a copy of the file system metadata snapshot tree, as disclosed herein, may extend the retention time period for the associated backup data such that the backup data is not deleted while the backup data is being recovered to the specified location. The copy of the file system metadata snapshot tree is created by creating a copy of root node of the file system metadata snapshot tree corresponding to the version of the database to be recovered. The root node copy includes the same set of pointers as the copied root node, but includes a different node ID and view ID. Copying the root node of the file system metadata snapshot tree corresponding to the version of the database to be recovered is near instantaneous because the amount of data that is being copied is very small (e.g., bytes).

The file system metadata snapshot tree copy provides a complete view of the storage volume storing the files associated with the particular database version. Using the metadata associated with the database, the one or more files associated with the version of the database may be identified. The file system metadata snapshot tree may be traversed to determine a location of the files associated with the version of the database to be recovered. The data of the files associated with the version of the database to be recovered may be located, provided to the specified location, and stored at the specified location. The specified location may include a database application. Upon receiving and storing all of the data of the files associated with the version of the database to be recovered, the version of the database has been recovered to the specified location. After the version of the database has been successfully recovered to the specified location, the copied root node may be deleted. This may allow the storage system to free up storage space. For example, deleting the copy of the file system metadata snapshot tree may revoke the extension and allow the data to be deleted.

In other embodiments, a version of the database may be cloned to allow a testing/development system to make one or more changes to the cloned version of the database. A database may be very large in size (e.g., terabytes) and a testing/development system may have limited storage available (e.g., gigabytes) to store the database. A user of the testing/development system may desire to run some queries on the database and/or make some test modifications to the database. Instead of transferring contents of an entire database to the testing/development system, a clone of a backup of the database may be created on the secondary storage system that already storing a copy of the database via its backup copy and the testing/development system is allowed access to the cloned copy on the separate secondary storage system. This allows the backup data to be used not only for backup purposes but also as live data for other purposes such as testing and development because changes made to the backup data from these other purposes are captured on the cloned copy of the backup data.

To clone the backup in a fast manner without actually copying data content of the database, a copy of the root node of the file system metadata snapshot tree associated with a backup of the desired version of the database is created. The root node copy includes the same set of pointers as the copied root node, but includes a different node ID and view ID. The cloned file system metadata snapshot tree is a representation of a fully hydrated backup because it provides a complete view of the storage volume(s) at a particular moment in time and provides a complete view of the particular database version. A user of the testing/development system is provided with access to the cloned version of the database. The user may make one or more changes to the cloned database. When a user desires to modify a leaf node associated with the cloned file system metadata snapshot tree, a copy-on-write procedure is implemented. The cloned file system metadata snapshot tree is traversed from the root node copy to the leaf node. The view identifier associated with each node along the path to the leaf node is inspected. In the event the view identifier associated with a node matches the view identifier associated with the root node copy, then the cloned file system metadata snapshot tree is traversed to the next node along the path. In the event the view identifier associated with a node does not match the view identifier associated with the root node copy, then a copy of the node with the non-matching view identifier is created. The copy of the node with the non-matching view identifier includes the same set of pointers as the copied node, but includes a different node ID and a view identifier of the root node copy. A pointer of the node that pointed to the node with the non-matching view identifier is updated. The pointer is updated to point to the copy of the node with the non-matching view identifier instead of the node with the non-matching view identifier. The copy-on write process continues until the leaf node associated with the clone file system metadata snapshot tree is copied and modified. When the user is finished using the cloned database, the root node copy may be deleted.

In some embodiments, database metadata may be associated (e.g., recorded) with a corresponding stored backup instance to allow efficient identification of information about one or more databases backed up in the stored backup instance. The database metadata may indicate one or more files associated with the version of the database. The one or more files associated with the version of the database may be the files associated with a backup to which a user of the testing/development system is given permission to access. A clone of a backup may provide a user of the testing/development system with access to any of the files associated with a backup. The one or more files associated with the version of the database may include a flag or other indicator to indicate that the user associated with the testing/development has permission to access the file. In the event the file does not include a flag or other indicator, then the user may not have permission to access the file. For example, the user may try to access a non-database file and denied access to the file.

In other embodiments, rather than only restoring contents of a database in response to a request a database, an entire storage volume that includes database contents may be restored to a particular point in time. A system may go offline (e.g., the system has been infected with a virus, infected with malware, experienced a hardware failure, etc.). It may be desirable to restore the system to a particular point in time using a file system metadata snapshot tree corresponding to a backup instance of the entire storage volume.

In some embodiments, the database may be restored to a particular point in time that does not exactly align to when a backup was created. The closest backup instance captured before the desired restore point is identified. The closest backup instance (e.g., a copy of the backup instance) is modified using a database transaction log by applying the database transaction(s) that occur in between the creation of the backup instance and the desired restore point to generate modified backup data that can be used to restore the database to the desired restore point.

FIG. 1 is a block diagram illustrating an embodiment of a system for generating fully hydrated backups. In the example shown, system 100 includes a primary system 102, secondary storage system 112, and a testing/development system 122.

Primary system 102 may be a virtual machine or a physical machine running a database application 103, such as a SQL server. Database application 103 may create one or more database files, such as a ".mdf" file, a ".ldf" file, or a ".ndf" file. A ".mdf" file is a primary database file. A ".ldf" file is a transaction log file. A ".ndf" file is a secondary database file. Primary system 102 may include a primary storage volume 106 and one or more secondary storage volumes 107 that stores the database data associated with database application 103 and non-database data associated with primary system 102. In some embodiments, primary system 102 may be comprised of a single storage volume.

Primary system 102 may perform a backup of primary storage volume 106 and/or the one or more secondary storage volumes 107. The backup provides a snapshot of primary system 102 at a particular moment in time. The backup may be a full backup or an incremental backup of the storage volume(s). A full backup is comprised of all of the data stored in the primary storage volume 106 and the one or more secondary storage volumes 107. The full backup may include database data associated with database application 103. The full backup may include metadata associated with the database. The metadata associated with the database may include log sequence numbers (LSN), one or more file names, a creation date, offline/online status. The full backup may also include non-database data of primary system 102.

An incremental backup is comprised of data stored in the primary storage volume 106 and the one or more secondary storage volumes 107 that was not previously backed up, i.e., they were not part of a previous full backup or a previous incremental backup. The incremental backup may include metadata associated with the database that was not part of a previous backup. The incremental backup may include new database files associated with database application 103 or portions of the database associated with database application 103 that were modified since a previous backup. The incremental backup may include metadata associated with the database that was not part of a previous backup. The metadata associated with the database files that were not part of a previous backup may include log sequence numbers (LSN), one or more file names, a creation date, offline/online status. The incremental backup may include non-database data that was not part of a previous backup.

Primary system 102 may include a change block tracker 105. Change block tracker 105 is configured to maintain a map of the one or more storage volumes to track changes to the database files and non-database files of the one or more storage volumes. The change block tracker is configured to determine the database files and non-database files of the one or more storage volumes that have changed since a previous backup. The change block tracker may receive database files and non-database files in route to being stored at the one or more storage volumes. Database files and non-database files may be stored in primary storage volume 106, one or more secondary storage volumes 107, or a combination of primary storage volume 106 and the one or more secondary storage volumes 107.

Primary system 102 may include a backup agent 104 (e.g., Cohesity agent). Backup agent 104 may be configured to communicate with one or more services 106 (e.g., Volume Snapshot Service (VSS), virtual desktop infrastructure (VDI)) that communicate with database application 103. Backup agent 104 may orchestrate a backup of primary system 102. In some embodiments, backup agent 104 may initiate a backup according to one or more backup policies. In some embodiments, a backup policy indicates that primary storage volume 106 and/or the one or more secondary storage volumes 107 are to be backed up on a periodic basis (e.g., hourly, daily, weekly, monthly, etc.). In other embodiments, a backup policy indicates that primary storage volume 106 and/or the one or more secondary storage volumes 107 are to be backed up when a threshold size of data has changed. In other embodiments, a backup policy indicates that the primary storage volume 106 and/or the one or more secondary storage volumes 107 are to be backed up upon a command from a user associated with primary storage system 102.

Backup agent 104 may send a command to one of the one or more services 106 (e.g., VSS service) to quiesce database application 103 to ensure the database is in a consistent state before performing a backup of primary system 102. In the event database application 103 is quiesced, any subsequent operation requests to the database will be queued by primary system 102 and not performed. The metadata associated with the database may be recorded. The metadata may include log sequence numbers (LSN), one or more file names, a creation date, offline/online status of the database at the time the database application is quiesced. If the metadata associated with a database indicates that the database is offline, then the database is not able to be restored because the files associated with the database are in a questionable state.

Primary storage system 102 may be configured to send a transaction log file segment to another storage system, such as secondary storage system 112. The transaction log file segment includes a sequence of transactions made to a database. The transaction log file may be a running log file of all the transactions associated with a database. The transaction log file segment is a part of the transaction log file. A backup (full or incremental) includes the data associated with a database at a particular moment in time. The particular moment in time corresponds to a specific transaction associated with the database. There may be a gap in transactions between backups. For example, a first backup of a database may correspond to the database at the $100^{th}$ transaction. A second backup of the database may correspond to the database at the $200^{th}$ transaction. A transaction log file segment may be associated with transactions 50-200 of the database. A request may be received to restore the database to any transaction between the $100^{th}$ transaction and the $200^{th}$ transaction. The transaction log file segment may be applied to the first backup of the database to restore the database to any transaction between the $100^{th}$ transaction and the $200^{th}$ transaction. A transaction log file segment may be sent to secondary storage system 112 according to one or more transaction log file policies. In some embodiments, a transaction log file policy indicates that the transaction log file is to be sent on a periodic basis (e.g., hourly, daily, weekly, monthly, etc.). In other embodiments, a transaction log file policy indicates that the transaction log file segment is to be sent after a certain number of transactions (e.g., 50 transactions, 100 transactions, etc.). In other embodiments, a transaction log file policy indicates that the transaction log file is to be sent upon a command from a user associated with primary storage system 102. In some embodiments, a transaction log file policy indicates that the segment of the transaction log file that was sent to secondary storage system 112 is to be deleted after the transaction log file is successfully stored at secondary storage system 112.

Primary storage system 102 may be comprised of one or more servers, one or more computing devices, one or more storage devices, and/or a combination thereof.

Secondary storage system 112 is comprised of a plurality of N nodes 111, 113, 115. In some embodiments, N is an odd number. Secondary storage system 112 may receive a backup (e.g., full backup or an incremental backup) from primary system 102. The backup represents the state of primary system 102 at a particular moment in time. The backup may be comprised of the data (e.g., one or more files) comprising the primary storage volume 106 and/or the one or more secondary storage volumes 107. The data may include data corresponding to a database at the particular moment in time. The backup may include metadata associated with database at the particular moment in time. The backup may include non-database data. Secondary storage system 112 may store the backup across the plurality of nodes 111, 113, 115.

Secondary storage system 112 may receive a transaction log file segment from primary system 102. The transaction log file segment includes a sequence of transactions made to a database. The transaction log file segment may be received as part of a backup or the transaction log file segment may be separately received from primary system 102. A transaction log file segment may be received based on one or more transaction log file policies associated with the transaction log file.

Secondary storage system 112 may include a file system manager 117. File system manager 117 is configured to maintain file system metadata in a file system metadata snapshot tree structure and database file data in a corresponding database file snapshot tree. The database file data may include contents of a file and/or metadata specific to the file. File system manager may be configured to store database metadata. The database metadata may include information associated with different versions of a database, such as one or more database files included in a version of a database. File system manager 117 may be configured to recover or restore a particular version of a database. File system manager 117 may be configured to inspect the database metadata to determine one or more files that are associated with the particular version of the database. File system manager 117 may be configured to perform a clone of a file system metadata snapshot tree. File system manager may be configured to perform a clone of a file snapshot tree. File system manager 117 may be configured to recover a volume and an associated database to a particular point in time. File system manager 117 may be configured to perform one or more modifications, as disclosed herein, to a file system metadata snapshot tree or to a file snapshot tree.

A tree data structure may be comprised of one or more file system metadata snapshot trees. A file system metadata snapshot tree may include a root node, one or more levels of intermediate nodes, and one or more leaf nodes. The root node is the starting point of a file system metadata snapshot tree and may include pointers to one or more other nodes. The root node includes an identifier that indicates a view with which the root node is associated. An intermediate node is a node to which another node points (e.g., root node, other intermediate node) and includes one or more pointers to other nodes. A leaf node is a node at the bottom of a file system metadata snapshot tree. A leaf node may be configured to store key-value pairs of metadata associated with the file system. A leaf node may be configured to store key-value pairs of data associated with the database. A leaf node may be configured to store key-value pairs of non-database data. In some embodiments, a leaf node includes a pointer to a file snapshot tree. For example, a leaf node of a tree data structure storing file system metadata associated with the database (e.g, filename) may include a pointer to a root node of a tree data structure storing data associated with the database (e.g, the contents of the file). In some embodiments, a leaf node includes a pointer to a storage location. For example, a leaf node of a tree data structure storing data associated with the database may include a pointer to a storage location that stores the data. Each node of the tree structure includes a node ID and an identifier of a snapshot tree that identifies a snapshot tree with which the node is associated (e.g., TreeID).

The tree data structure can be used to capture different versions of a database at different moments in time. A backup received from primary system 102 may include data associated with a first version of a database at a first point in time and database metadata associated with the first version of the database at the first point in time. A subsequent backup received from primary system 102 may include a data associated with a second version of the database at a second point in time and database metadata associated with the second version of the database at the second point in time. Each version of the database may be represented as part of a corresponding file system metadata snapshot tree. The tree data structure allows a chain of file system metadata snapshot trees (i.e., each corresponding file system metadata snapshot tree) to be linked together by allowing a node of a later version of a file system metadata snapshot tree to reference a node of a previous version of a file system metadata snapshot tree. The tree data structure also allows a chain of file snapshot trees (i.e., each corresponding file snapshot tree) to be linked together by allowing a node of a later version of a file snapshot tree to reference a node of a previous version of a file snapshot tree. A version of the database may be determined by inspecting the database metadata associated the version of the database to determine one or more files associated with the database version. The one or more files associated with the database version may be found by traversing a file system metadata snapshot tree associated with the version of the database to the leaf nodes storing metadata (e.g., file name) associated with the one or more files. The leaf nodes storing metadata associated with the one or more files may include a pointer to a file snapshot tree storing data associated with a database file. The data associated with the database file may include contents of a file and/or metadata specific to the file. A leaf node of the file snapshot tree storing data associated with a database file may include a pointer to a physical location storing a portion of the data associated with the database file. The data associated with a database file may be determined by traversing the file snapshot tree storing data associated with the database file.

For each backup instance, a new file system metadata snapshot tree is added to the corresponding tree data structure by adding a new root node to the tree data structure corresponding to file system metadata. The new root node is a copy of the previous root node and includes the set of pointers included in the previous root node, that is, the new root node includes one or more pointers to an intermediate node or leaf node associated with a previous file system metadata snapshot tree. However, among other differences, the new root node includes a node ID and an identifier (e.g., TreeID) that is different than the identifier (e.g., TreeID) of the previous root node. The identifier associated with a node identifies a snapshot tree and view with which the node is associated. In some embodiments, the previous root node is deleted after a snapshot is performed.

A file system metadata snapshot tree captures a view of the data at a particular moment in time. The view may be a current view or a snapshot view. A current view may represent a state of the data that is up-to-date and capable of receiving one or more modifications to the file system metadata snapshot tree that correspond to modifications to the data. A snapshot view may represent a state of the data at a particular moment in time in the past and is not updated. The view of a snapshot may change from a current view to a snapshot view when a subsequent file system metadata snapshot tree is added to the tree data structure. For example, a file system metadata snapshot tree at t=1 may be a current view and accept one or more modifications to the file system metadata snapshot tree. When another file system metadata snapshot tree is added to the tree data structure at t=2, another root node is added to the tree data structure. The snapshot associated with t=1 at t=2 becomes a snapshot view and the snapshot at t=2 is a current view of the tree data structure.

Secondary storage system 112 may be configured to recover a particular version of a database to a specified location. The specified location may be primary system 102 or another system, such as testing/development system 122 or another system (not shown). The database stored at the specified location may become corrupted and needs to be recovered to a particular point in time. Secondary storage system 112 may identify a file system metadata snapshot tree corresponding to the version of the database to be recovered. A copy of the file system metadata snapshot tree corresponding to the version of the database to be recovered is created. The copy of the file system metadata snapshot tree is created by creating a copy of root node of the file system metadata snapshot tree corresponding to the version of the database to be recovered. The root node copy includes the same set of pointers as the copied root node, but includes a different node ID and view ID. The file system metadata snapshot tree copy provides a complete view of the storage volumes. Database metadata may be stored at the secondary storage system. The database metadata may identify one or more files associated with the particular database version. The copied file system metadata snapshot tree may be traversed to find the one or more files associated with the particular database version and a storage location associated with the data of the one or more files associated with the particular database version. The data associated with the one or more files associated with the particular database version may be provided to and stored at the specified location.

Secondary storage system 112 may be configured to clone a particular version of a database for a specified location. A database may be very large in size (e.g., terabytes) and a testing/development system may have limited storage available (e.g., gigabytes) to store the database. A user of the testing/development system may desire to run some queries on the database and/or to make test modifications to the database. Instead of transferring contents of an entire database to the testing/development system, a clone of a desired database version of a database, i.e., a test version, may be created. A file system metadata snapshot tree corresponding to the version of the database to be cloned is identified. A copy of the file system metadata snapshot tree corresponding to the version of the database to be recovered is created. Cloning the file system metadata snapshot tree that corresponds to the version of a database to be cloned frees up storage of the testing/development system for other purposes and reduces the amount of time needed to run some queries on the database because the database data does not need to be transferred from the secondary storage system to the testing/development system. This also shields the integrity of the data stored at the secondary storage system because the user of the testing/development system is unable to modify any real versions of the database.

To create a clone of a desired version of the database, secondary storage system 112 may create a copy of the root node of the file system metadata snapshot tree associated with the desired version of the database. The root node copy includes the same set of pointers as the copied root node, but includes a different node ID and view ID. The file system metadata snapshot tree copy is a representation of a fully hydrated backup because it provides a complete view of the storage volume(s) at a particular moment in time and provides a complete view of the particular database version. A user of the testing/development system is provided with access to the cloned version of the database. The user may make one or more changes to the cloned database. When a user desires to modify a leaf node associated with the cloned file system metadata snapshot tree, a copy-on-write procedure is implemented. The cloned file system metadata snapshot tree is traversed from the root node copy to the leaf node. The view identifier associated with each node along the path to the leaf node is inspected. In the event the view identifier associated with a node matches the view identifier associated with the root node copy, then the cloned file system metadata snapshot tree is traversed to the next node along the path. In the event the view identifier associated with a node does not match the view identifier associated with the root node copy, then a copy of the node with the non-matching view identifier is created. The copy of the node with the non-matching view identifier includes the same set of pointers as the copied node, but includes a different node ID and a view identifier of the root node copy. A pointer of the node that pointed to the node with the non-matching view identifier is updated. The pointer is updated to point to the copy of the node with the non-matching view identifier instead of the node with the non-matching view identifier. The copy-on write process continues until the leaf node associated with the clone file system metadata snapshot tree is copied and modified. When the user is finished using the cloned database, secondary storage system 112 may delete the root node copy.

Secondary storage system 112 may be configured to restore an entire storage volume to a particular point in time for which a backup is stored. A system may go offline (e.g., the system has been infected with a virus, infected with malware, experienced a hardware failure, etc.) It may be desirable to restore the system to a particular point in time. Secondary storage system 112 may create a corresponding file system metadata snapshot tree for a backup. The backup corresponds to the storage volume(s) at a particular point in time. In response to a request to restore the entire storage volume to a particular point in time, the file system metadata snapshot tree associated with the particular point in time is identified. A copy of the file system metadata snapshot tree corresponding to the entire storage volume to be restored is created. The storage system may implement a retention policy to delete data after a certain period of time of the data creation date (e.g., 30 days). The retention time period may expire while the data is being restored to a specified location. Creating a copy of the file system metadata snapshot tree, as disclosed herein, may extend the retention time period for the data such that the data is not deleted while the data is being restored to the specified location. The copy of the file system metadata snapshot tree is created by creating a copy of root node of the file system metadata snapshot tree corresponding to the entire storage volume to be restored. The root node copy includes the same set of pointers as the copied root node, but includes a different node ID and view ID. The file system metadata snapshot tree copy provides a complete view of the storage volume at the particular point in time. The file system metadata snapshot tree may be traversed to determine a location of the files associated with the storage volume to be restored. The data of the files associated with the storage volume to be restored may be located, provided to the specified location, and stored at the specified location. Upon receiving and storing all of the data of the files associated with the storage volume to be restored, the storage volume has been restored to the specified location. After the entire storage volume has been successfully restored to the specified location, the copied root node may be deleted. This may allow the storage system to free up storage space. As discussed above, creating a copy of the file system metadata snapshot tree may extend the retention time period associated with data. Deleting the copy of the file system metadata snapshot tree may revoke the extension and allow the data to be deleted.

Secondary storage system 112 may be configured to restore a database to a particular point in time in between backups. A system may go offline (e.g., the system has been infected with a virus, infected with malware, experienced a hardware failure, etc.) It may be desirable to restore the system and its associated database to a particular point in time. A secondary storage system may receive data associated with a full or incremental backup from a primary system. The backup represents a state of the primary system at a particular point in time and corresponds to a version of a database. A file system metadata snapshot tree corresponding to the backup may be created. Metadata associated with the database may indicate the file system metadata snapshot tree corresponding to the version of the database to be restored. Metadata associated with the database may indicate one or more files associated with the version of the database to be restored. A transaction log file segment includes a sequence of transactions that are made with respect to a database. The transaction log file segment may include transactions that are made to the database between backups. The backup corresponds to a particular transaction of the transaction log file. The secondary storage system 112 may store one or more transaction log file segments. In some embodiments, the secondary storage system 112 may receive the transaction log file segment separately from a backup. The transaction log file segment may be applied to a database to modify the database to any transaction point for which there is an associated transaction log file segment stored on the secondary storage system. For example, a first backup may represent the state of a database after the nth transaction. A second backup may represent the state of the database after the n+100 transaction. The database may be restored to any transaction between transactions n and n+100 as long as the transaction log file segment includes a record of transactions n to n+100.

To restore the database to the particular point in time between backups, file system manager 117 may apply the one or more transactions that occur after the particular transaction of the transaction log file segment corresponding to the backup to the backup. File system manager 117 may apply the one or more transactions until the transaction corresponding to the particular point in time. A transaction may correspond to a modification to the file system metadata snapshot tree. A leaf node of the file system metadata snapshot tree may include a pointer to a database file snapshot tree. The database file snapshot tree is a subtree of the file system metadata snapshot tree. The database file snapshot tree may store the contents of the database file and/or metadata specific to the database file. A leaf node of the database file snapshot tree may include a pointer to a storage location associated with a portion of the database file. In the event a transaction of the transaction log file segment is a query request, the file system metadata snapshot tree is unchanged. In the event a transaction of the transaction log file segment is a database file modification, a corresponding modification is made to the file system metadata snapshot tree and/or one of the database file snapshot trees.

For example, in the event a data value of the database has been modified, a copy-on-write procedure is implemented. File system manager 117 may identify a file system metadata snapshot tree corresponding to the closest backup before the particular point in time. File system manager 117 may create a copy of the file system metadata snapshot tree by copying the root node of the file system metadata snapshot tree. The root node copy of the file system metadata snapshot tree includes the same set of pointers as the root node of the file system metadata snapshot tree, but includes a different node ID and view identifier. File system manager 117 may also create a copy of the root node associated with the database file snapshot tree corresponding to the database file. File system manager 117 may update a pointer of a leaf node of the file system metadata snapshot tree that pointed to the root node of the database file snapshot tree to point to the root node copy of the root node associated with the database file snapshot tree corresponding to the database file instead of pointing to the root node associated with the database file snapshot tree corresponding to the database file.

The root node copy of the root node associated with the database file snapshot tree corresponding to the database file includes the same set of pointers as the root node associated with the database file snapshot tree corresponding to the database file. However, among other differences, it includes a different node ID and a different view identifier. File system manager 117 may traverse the cloned database file snapshot tree from the root node copy of the database file snapshot tree corresponding to the database file to the leaf node to be modified. File system manager 117 may inspect the view identifier associated with each node along the path to the leaf node. In the event the view identifier associated with a node matches the view identifier associated with the root node copy of the cloned database file snapshot tree, then file system manager 117 may traverse the cloned database file snapshot tree to the next node along the path. In the event the view identifier associated with a node does not match the view identifier associated with the root node copy, then file system manager 117 may create a copy of the node with the non-matching view identifier. The copy of the node with the non-matching view identifier includes the same set of pointers as the copied node, but includes a different node ID and a view identifier of the root node copy. File system manager 117 may update a pointer of the node that pointed to the node with the non-matching view identifier. The pointer is updated to point to the copy of the node with the non-matching view identifier instead of the node with the non-matching view identifier. The copy-on write process continues until the leaf node associated with the clone file system metadata snapshot tree is copied and modified. File system manager 117 may modify the leaf node to point to a different location of the storage system.

After the cloned file system metadata snapshot tree and the corresponding cloned database file snapshot trees have been modified such that the cloned file system metadata snapshot tree and the corresponding cloned database file snapshot trees correspond to the database at the particular point in time, file system manager 117 may provide the entire cloned storage volume to a specified location. In some embodiments, file system manager 117 provides the updated database files to the specified location without providing the entire cloned storage volume. Upon receiving and storing the entire cloned storage volume, the specified location has been updated to include an entire volume corresponding to the closest preceding backup and a restored database corresponding to the particular moment in time. After the entire volume and database has been successfully recovered to the specified location, file system manager 117 may delete the root node copy of the root node of file system metadata snapshot tree corresponding to the closest backup before the particular point in time and the root node copy of the root node associated with the database file snapshot tree corresponding to the database file. In some embodiments, deleting the root node copies will also delete any nodes added to the cloned snapshot trees.

Secondary storage system 112 may protect a large volume of applications while supporting tight business requirements (recovery time objective (RTO) and recovery point objective (RPO)). Secondary storage system 112 may unify end-to-end protection infrastructure—including target storage, provide backup, replication of data, disaster recovery, and/or cloud tiering. Secondary storage system 1124 may provide scale-out, globally deduped, highly available storage to consolidate all secondary data, including backups, files, and test/dev copies. Secondary storage system 112 simplifies backup infrastructure and eliminates the need to run separate backup software, proxies, media servers, and archival. Secondary storage system 112 may be fully integrated with a virtual machine (VM) centralized management tool, such as vCenter, and an applications programming interface (API) for data protection. Secondary storage system 112 may reduce the amount of time to perform RPOs and support instantaneous RTOs by creating a clone of a backup VM and running the VM directly from Secondary storage system 112. Secondary storage system 112 may integrate natively with one or more cloud servers. Secondary storage system 112 may replicate data to a one or more cloud clusters to minimize potential data loss by replicating data as soon as a backup is completed. This allows data in the cloud to be used for disaster recovery, application migration, test/dev, or analytics.

Secondary storage system 112 may be comprised of one or more solid state drives, one or more hard disk drives, or a combination thereof. Secondary storage system 104 may include one or more processors coupled to the storage drives and configured to archive data stored in the storage drives to cloud storage system 106, a cluster 108, and/or one or more other storage mediums (e.g. tape, removable storage). In one embodiment, secondary storage system is comprised of one solid state drive and three hard disk drives.

Testing/Development System 122 may be configured to perform one or more tests on backup data stored at secondary storage system 112. Testing/Development System 122 may include a database application 123, an application 124, a primary storage volume 126, and one or more secondary storage volumes 127.

Database application 123 may create one or more database files, such as a ".mdf" file, a ".ldf" file, or a ".ndf" file. Testing/Development System 122 may include a primary storage volume 126 and one or more secondary storage volumes 127 that is configured to store database data associated with database application 123 and non-database data associated with Testing/Development System 122.

Testing/Development System 122 may be configured to receive data associated with a clone of a database. Testing/Development System 122 may be configured to create one or more volumes (e.g., X:/, Y:/) to store the received data. Upon storing the received data, a user of Testing/Development System 122 may make one or more modifications to the cloned database via database application 123.

Application 124 may provide Testing/Development System 122 with access to a cloned database stored at secondary storage system 122. Application 124 may provide a user of Testing/Development System 122 with the ability to make one or more modifications to the cloned database.

Testing/Development System 122 may be comprised of one or more servers, one or more computing devices, one or more storage devices, and/or a combination thereof.

Figure 2:
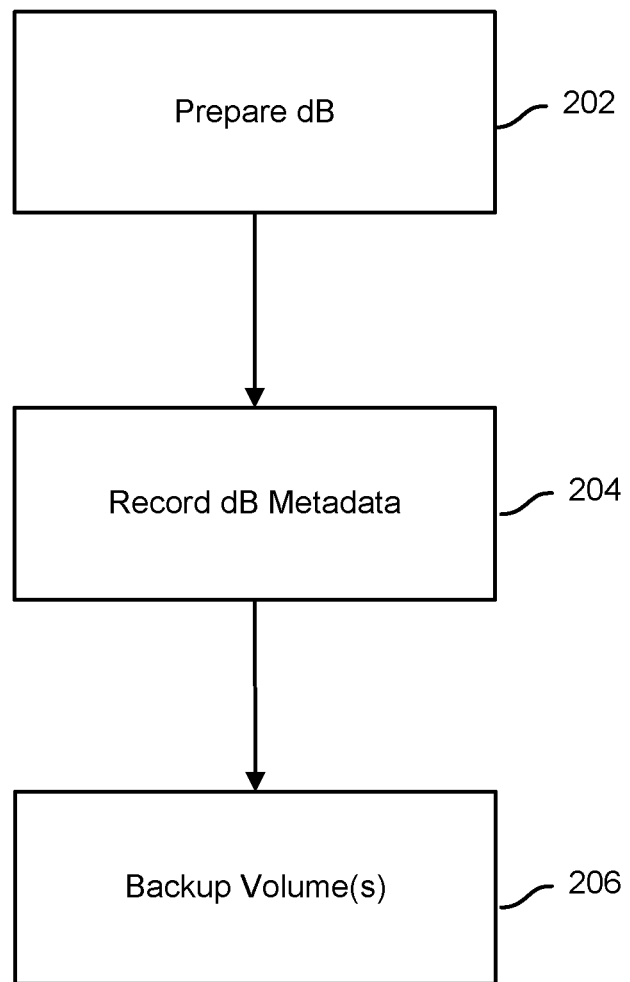
FIG. 2 is a flow chart illustrating an embodiment of a process for backing up a volume.

FIG. 2 is a flow chart illustrating an embodiment of a process for backing up a volume. In some embodiments, process 200 may be implemented by a system, such as primary system 102.

At 202, a database is prepared to be backed up. A backup agent (e.g., backup agent 104) may be configured to send a command to one or more services (e.g., VSS, VDI) running on a system. In response, the one or more services may be configured to send a command to quiesce a database application associated with the database. The database application may be quiesced to ensure the database is in a consistent state before performing a backup of a volume. In the event database application 103 is quiesced, any subsequent operation requests to the database will be queued by primary system 102 and not performed until the database application is unquiesced.

At 204, the database metadata associated with the database is recorded. The database metadata associated with the database may allow the database to be restored, cloned, recovered, and/or recreated. For example, although a backup may include file data associated with one or more storage volumes, i.e., the files stored in the one or more storage volumes, of the database system, it is helpful to receive from the database system metadata information about the one or more databases being backed up. The received database metadata may be associated (e.g., recorded) with a corresponding stored backup instance to allow efficient identification of information about one or more databases backed up in the stored backup instance. The database metadata may include log sequence numbers (LSN), one or more database file names, a creation date, offline/online status of the database at the time the database application is quiesced. If the database metadata indicates that the database is offline when the backup is being performed, then the database is not able to be restored from the associated stored backup instance because the backed up files associated with the database in the backup instance could be in an error state.

At 206, one or more volumes of a system of the database are backed up to a secondary storage system. By backing up the entire storage volumes instead of just database content, in the event the entire database system becomes corrupted, a backup of the one or more volumes of the system allows the entire system to be restored at any particular moment in time for which a backup exists. The backup may include a record of the system settings (e.g., virtual machine data) and/or configurations for the particular point in time. When the system is recreated using the backup of the one or more volumes, the system is configured with the settings and/or configurations associated with the particular moment in time. A volume may include data corresponding to the database, data corresponding to the metadata associated with the database, and/or data corresponding to non-database data of the system on which the one or more volumes reside.

Figure 3A:
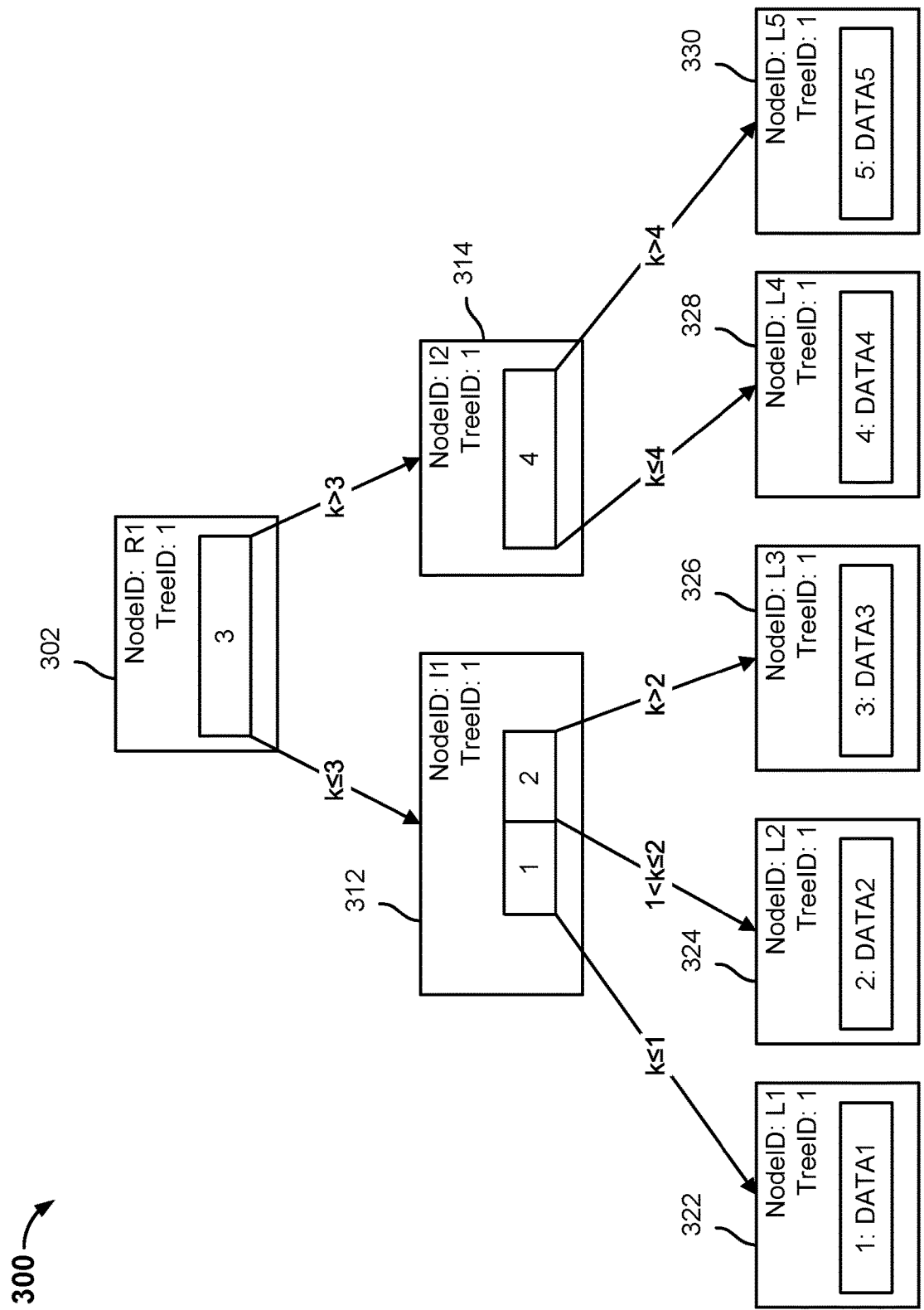
FIG. 3A is a block diagram illustrating an embodiment of a file system metadata snapshot tree.

FIG. 3A is a block diagram illustrating an embodiment of a file system metadata snapshot tree. In the example shown, file system metadata snapshot tree 300 may be created by a storage system, such as secondary storage system 112. In the example shown, file system metadata snapshot tree 300 includes a root node 302, intermediate nodes 312, 314, and leaf nodes 322, 324, 326, 328, and 330. Although snapshot tree 300 includes one intermediate level between root node 302 and leaf nodes 322, 324, 326, 328, 330, any number of intermediate levels may be implemented. A file snapshot tree may have a similar tree structure as the file system metadata snapshot tree. The number of levels between any leaf nodes and a root node of the same snapshot tree is the same. File system metadata snapshot tree 300 may be a snapshot tree that includes database data, file system metadata, or non-database data at a particular point in time t. File system metadata snapshot tree 300 may include leaf nodes associated with a version of a database. In some embodiments, root node 302 is associated with a file system metadata snapshot tree at a particular point in time t. In some embodiments, root node 302 is associated with the file snapshot tree at the particular point in time t. A file snapshot tree may correspond to a database file or a non-database file. A file snapshot tree may store the contents of a file and/or metadata specific to the file. The file system metadata may include information, such as file size, file name, directory structure, file permissions, physical storage locations of the files, etc.

A root node is the root of a file system metadata snapshot tree and may include pointers to one or more other nodes. Each pointer includes a range of numerical and sorted data keys that can be found by following that particular pointer. An intermediate node is a node to which another node points (e.g., root node, other intermediate node) and includes one or more pointers to one or more other nodes. A leaf node is a node at the bottom of a file system metadata snapshot tree. In some embodiments, a leaf node is a node to which another node points, but does not include a pointer to any other node. In other embodiments, a leaf node is a node to which another node points and includes a pointer to the root node of another snapshot tree. For example, a leaf node of a file system metadata snapshot tree may include a pointer to a file snapshot tree. A leaf node may store key-value pairs of database data, key-value pairs of database metadata, and key-value pairs of non-database data. A data key k is a lookup value by which a particular leaf node may be accessed. For example, "1" is a data key that may be used to lookup "DATA1" of leaf node 322. Examples of values stored by a leaf node include, but are not limited to, file size, directory structure, file permissions, physical storage locations of the files, file name etc. A leaf node may store a data key k and a pointer to a location that stores the value associated with the data key. The leaf node may store a key-value pair that corresponds to a portion of the data of the backed up storage volume.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 302 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 302 would be traversed to intermediate node 312 because the data keys of "1," "2", and "3" are less than or equal to the node key "3." To find a leaf node storing a value associated with a data key of "4" or "5," the second branch of root node 302 would be traversed to intermediate node 314 because data keys "4" and "5" are greater than the node key of "3."

In some embodiments, a hash function may determine which branch of a node with which the non-numerical data key is associated. For example, a hash function may determine that a first bucket is associated with a first branch of a node and a second bucket is associated with a second branch of the node.

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "4." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function may determine which branch of a node with which the non-numerical data key is associated.

In the example shown, root node 302 includes a pointer to intermediate node 312 and a pointer to intermediate node 314. Root node 302 includes a NodeID of "R1" and a TreeID of "1." The NodeID identifies the name of the node. The TreeID identifies the snapshot tree/view with which the node is associated. When a change is made to data stored in a leaf node as described with respect to FIGS. 3B, 3C, and 3D, the TreeID is used to determine whether a copy of a node is to be made.

Root node 302 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing file system metadata snapshot tree 300 from root node 302 to intermediate node 312 because the data keys have a value that is less than or equal to the node key. Leaf nodes with a data key of "4" or "5" may be found by traversing snapshot tree 300 from root node 302 to intermediate node 314 because the data keys have a value that is greater than the node key.

Root node 302 includes a first set of pointers. The first set of pointers associated with a data key less than the node key (e.g., "1", "2," or "3") indicates that traversing snapshot tree 300 from root node 302 to intermediate node 312 will lead to a leaf node with a data key of "1," "2," or "3." Intermediate node 314 includes a second set of pointers. The second set of pointers associated with a data key greater than the node key indicates that traversing snapshot tree 300 from root node 302 to intermediate node 314 will lead to a leaf node with a data key of "4" or "5."

Intermediate node 312 includes a pointer to leaf node 322, a pointer to leaf node 324, and a pointer to leaf node 326. Intermediate node 312 includes a NodeID of "I1" and a TreeID of "1." Intermediate node 312 includes a first node key of "1" and a second node key of "2." The data key k for leaf node 322 is a value that is less than or equal to the first node key. The data key k for leaf node 324 is a value that is greater than the first node key and less than or equal to the second node key. The data key k for leaf node 326 is a value that is greater than the second node key. The pointer to leaf node 322 indicates that traversing file system metadata snapshot tree 300 from intermediate node 312 to leaf node 322 will lead to the node with a data key of "1." The pointer to leaf node 324 indicates that traversing snapshot tree 302 from intermediate node 312 to leaf node 324 will lead to the node with a data key of "2." The pointer to leaf node 326 indicates that traversing file system metadata snapshot tree 300 from intermediate node 312 to leaf node 326 will lead to the node with a data key of "3."

Intermediate node 314 includes a pointer to leaf node 328 and a pointer to leaf node 330. Intermediate node 312 includes a NodeID of "I2" and a TreeID of "1." Intermediate node 314 includes a node key of "4." The data key k for leaf node 328 is a value that is less than or equal to the node key. The data key k for leaf node 330 is a value that is greater than the node key. The pointer to leaf node 328 indicates that traversing file system metadata snapshot tree 300 from intermediate node 314 to leaf node 328 will lead to the node with a data key of "4." The pointer to leaf node 330 indicates that traversing file system metadata snapshot tree 300 from intermediate node 314 to leaf node 330 will lead the node with a data key of "5."

Leaf node 322 includes a data key-value pair of "1: DATA1." Leaf node 322 includes NodeID of "L1" and a TreeID of "1." To view the value associated with a data key of "1," file system metadata snapshot tree 300 is traversed from root node 302 to intermediate node 312 to leaf node 322.

Leaf node 324 includes a data key-value pair of "2: DATA2." Leaf node 324 includes NodeID of "L2" and a TreeID of "1." To view the value associated with a data key of "2," file system metadata snapshot tree 300 is traversed from root node 302 to intermediate node 312 to leaf node 324.

Leaf node 326 includes a data key-value pair of "3: DATA3." Leaf node 326 includes NodeID of "L3" and a TreeID of "1." To view the value associated with a data key of "3," file system metadata snapshot tree 300 is traversed from root node 302 to intermediate node 312 to leaf node 326.

Leaf node 328 includes a data key-value pair of "4: DATA4." Leaf node 328 includes NodeID of "L4" and a TreeID of "1." To view the value associated with a data key of "4," file system metadata snapshot tree 300 is traversed from root node 302 to intermediate node 314 to leaf node 328.

Leaf node 330 includes a data key-value pair of "5: DATA5." Leaf node 330 includes NodeID of "L5" and a TreeID of "1." To view the value associated with a data key of "5," file system metadata snapshot tree 300 is traversed from root node 302 to intermediate node 314 to leaf node 330.

Figure 3B:
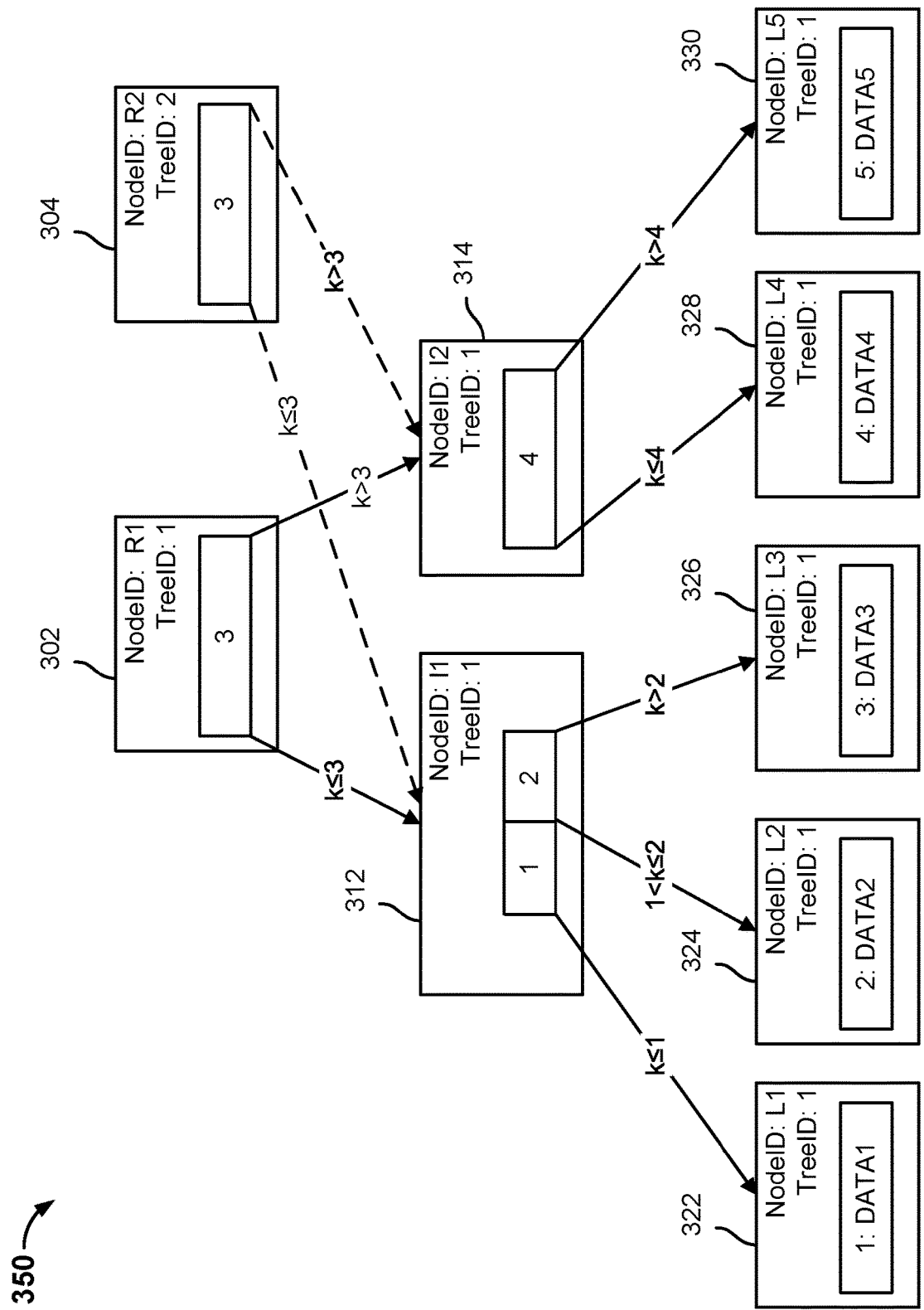
FIG. 3B is a block diagram illustrating an embodiment of adding a root node to an existing tree data structure.

FIG. 3B is a block diagram illustrating an embodiment of adding a root node to an existing tree data structure. Adding a root node to the existing tree data structure may enable a plurality of backups to be linked together. Adding a root node to the existing tree data structure may enable a plurality of database file versions to be linked together. Adding a root node to the existing tree data structure may enable a plurality of non-database file versions to be linked together. Adding a root node to the existing tree data structure may enable a clone of a snapshot tree to be created. Adding a root node to the existing tree data structure may enable a database to be recovered. Adding a root node to the existing tree data structure may allow an entire volume to be recovered.

In the example shown, tree data structure 350 may be created by a storage system, such as secondary storage system 112. A file system metadata snapshot tree includes root node 304, intermediate nodes 312, 314, and leaf nodes 322, 324, 328, and 330. File system metadata snapshot tree may be a snapshot of the file system metadata, a snapshot of database data, and/or a snapshot of the non-database data at a particular point in time t+n. The file system metadata snapshot tree may be a clone of a previous snapshot tree, e.g., file system metadata snapshot tree 300. The tree data structure 350 allows a chain of snapshot trees to be linked together. Each time a snapshot tree is linked to a previous snapshot tree, a root node of the snapshot tree may be linked to one or more intermediate nodes associated with a previous snapshot tree.

In the example shown, the file system metadata snapshot tree at t=t+n is linked to snapshot tree at t=t. To create a snapshot of the database data at time t+n, a copy of the previous root node is created. The root node copy includes the same set of pointers as the previous root node. The root node copy also includes a different NodeID and a different TreeID. The TreeID is the identifier associated with a snapshot tree. Root node 304 is associated with the snapshot of the database data at the particular point in time t+n. Root node 302 is associated with the snapshot of the database data at the particular point in time t. The file system metadata snapshot tree at t=t+n may correspond to a version of a snapshot tree. In some embodiments, the file system metadata snapshot tree at t=t+n is a current view of the file system metadata. A current view may still accept one or more changes to the data. A clone of a file system metadata snapshot tree may be a current view because a testing/development system may access the data associated with the cloned file system metadata snapshot tree and make one or more modifications to the data associated with the cloned file system metadata snapshot tree, which result in one or more corresponding modifications to the cloned file system metadata snapshot tree. The TreeID of a root node indicates a snapshot with which the root node is associated. For example, root node 302 with a TreeID of "1" is associated with a first snapshot tree and root node 304 with a TreeID of "2" is associated with a second snapshot tree. In other embodiments, the file system metadata snapshot tree at t=t+n is a snapshot view of the file system metadata. A snapshot view may not accept any changes to the data. A snapshot view may be used to restore or recover a database to a specified location (e.g., primary system or alternate system).

In some embodiments, to create a snapshot of the file system at time t+n, two root node copies are created. Providing two new root nodes, each with a different TreeID prevents updates made to a particular view (e.g., current view) from affecting nodes of a different view (e.g., snapshot view). One of the new root nodes may be associated with a current view (i.e., modifiable) and the other new root node may be associated with a snapshot view (i.e., not modifiable). In some embodiments, both new root nodes are associated with a current view. In other embodiments, both new root nodes are associated with a snapshot view. In some embodiments, a root node associated with a previous snapshot is deleted after a snapshot is performed, i.e., root node 302 is deleted after root node 304 is created.

In the example shown, root node 304 is a copy of root node 302. Similar to root node 302, root node 304 includes the same pointers as root node 302. However, among other differences, root node 304 includes a different node ID and a different view identifier. Root node 304 includes a first set of pointers to intermediate node 312. The first set of pointers associated with a data key k less than or equal to the node key (e.g., "1," "2," or "3") indicates that traversing tree data structure 350 from root node 304 to intermediate node 312 will lead to a leaf node with a data key of "1," "2," or "3." Root node 304 includes a second set of pointers to intermediate node 314. The second set of pointers associated with a data key k greater than the node key indicates that traversing tree data structure 350 from root node 304 to intermediate node intermediate node 314 will lead to a leaf node with a data key of "4" or "5." Root node 304 includes a NodeID of "R2" and a TreeID of "2." The NodeID identifies the name of the node. The TreeID identifies the snapshot tree with which the node is associated.

Figure 3C:
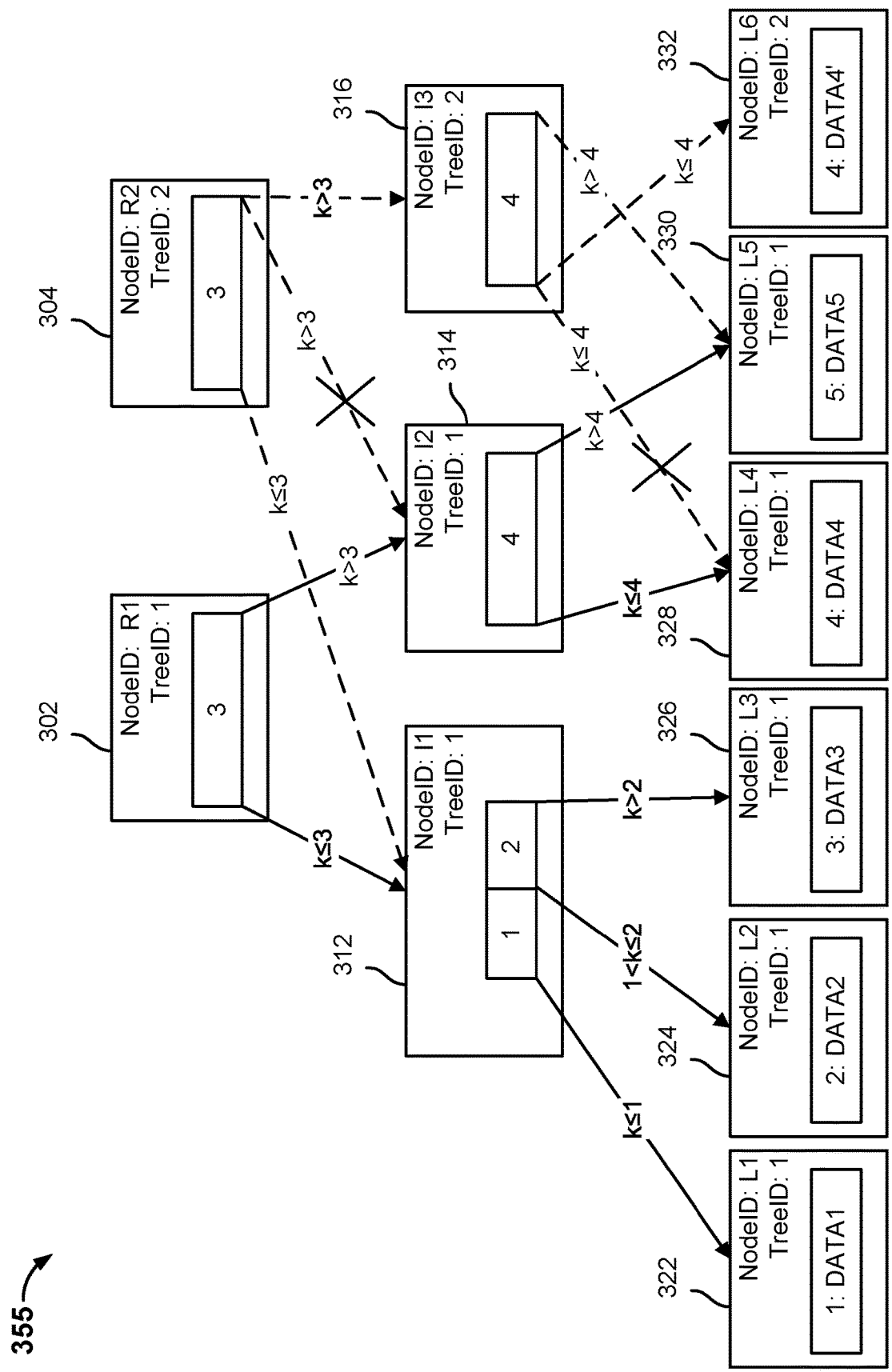
FIG. 3C is a block diagram illustrating an embodiment of modifying a tree data structure.

FIG. 3C is a block diagram illustrating an embodiment of modifying a tree data structure. In the example shown, tree data structure 355 may be modified by a file system manager, such as file system manager 117. Tree data structure 355 may be a current view of the file system data at time t+n. A current view may still accept one or more changes to the data. A clone of a snapshot tree may be a current view. Because a snapshot represents a perspective of the file system metadata that is "frozen" in time, one or more copies of one or more nodes affected by a change to file system metadata, are made. Tree data structure 355 may correspond to a modified version of tree data structure 350.

In the example shown, the value "DATA4" has been modified to be "DATA4'." The value may correspond to a file system metadata value. The value may corresponding to a file data value. At time t+n, the file system manager starts at root node 304 because that is the root node associated with file system metadata snapshot tree at time t+n. The value "DATA4" is associated with the data key "4." The file system manager traverses tree data structure 355 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 304 and proceeds to intermediate node 314. The file system manager compares the TreeID of intermediate node 314 with the TreeID of root node 304 (the identifier associated with a snapshot tree at time t=t+n), determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a set of pointers of root node 304 to point to intermediate node 316 instead of pointing to intermediate node 314. The file system manager traverses tree data structure 355 from intermediate node 316 to leaf node 328, determines that the TreeID of leaf node 328 does not match the TreeID of root node 304, and creates a copy of leaf node 328. Leaf node copy 332 is updated to store the modified value "DATA4'" and includes the same TreeID as root node 304. The file system manager updates a pointer of intermediate node 316 to point to leaf node 332 instead of pointing to leaf node 328.

Figure 3D:
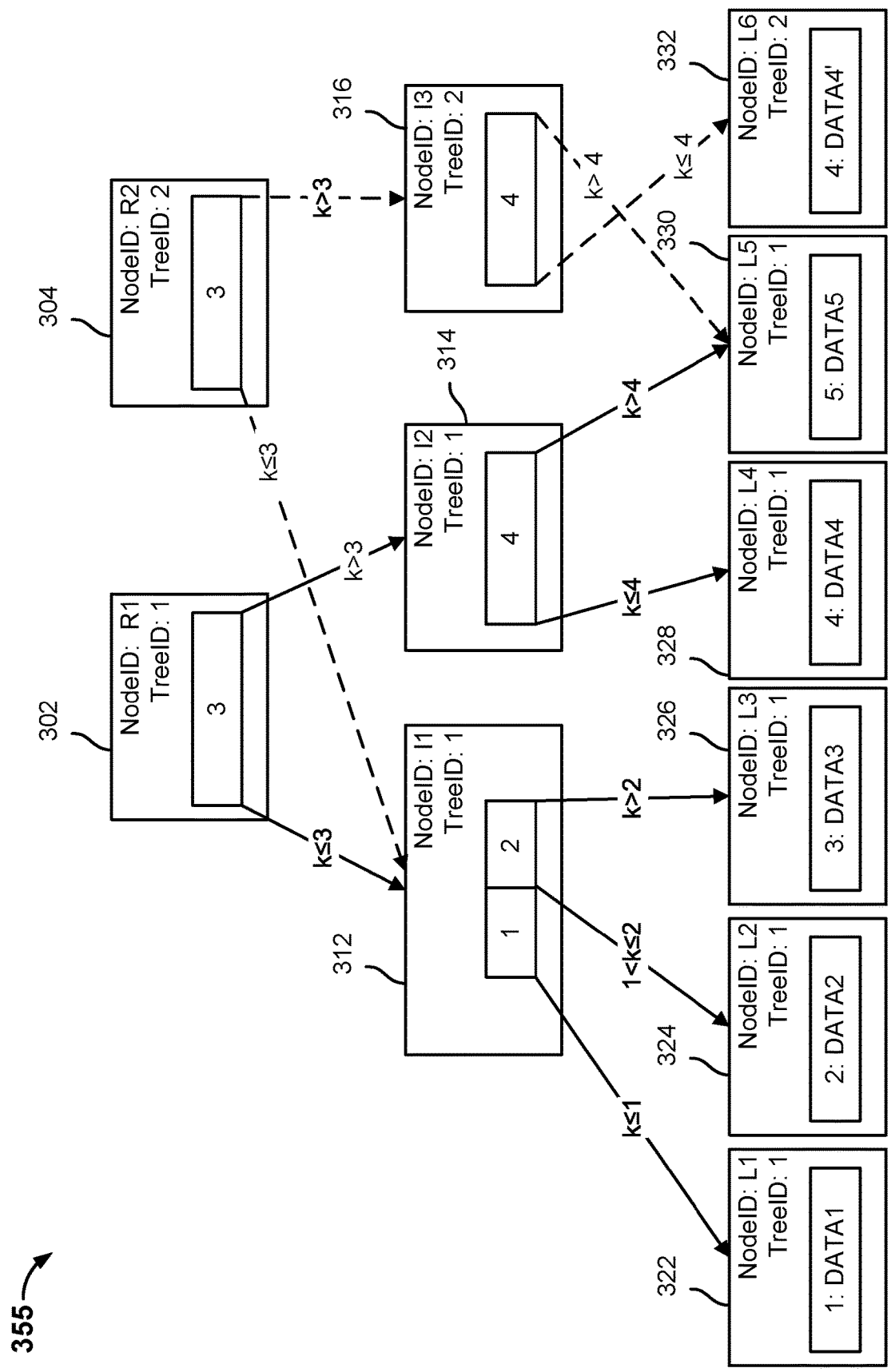
FIG. 3D is a block diagram illustrating an embodiment of a modified tree data structure.

FIG. 3D is a block diagram illustrating an embodiment of a modified tree data structure. The file system metadata snapshot tree shown in FIG. 3D illustrates a result of the modifications made to file system metadata snapshot tree at t=t+n as described with respect to FIG. 3C.

Figure 3E:
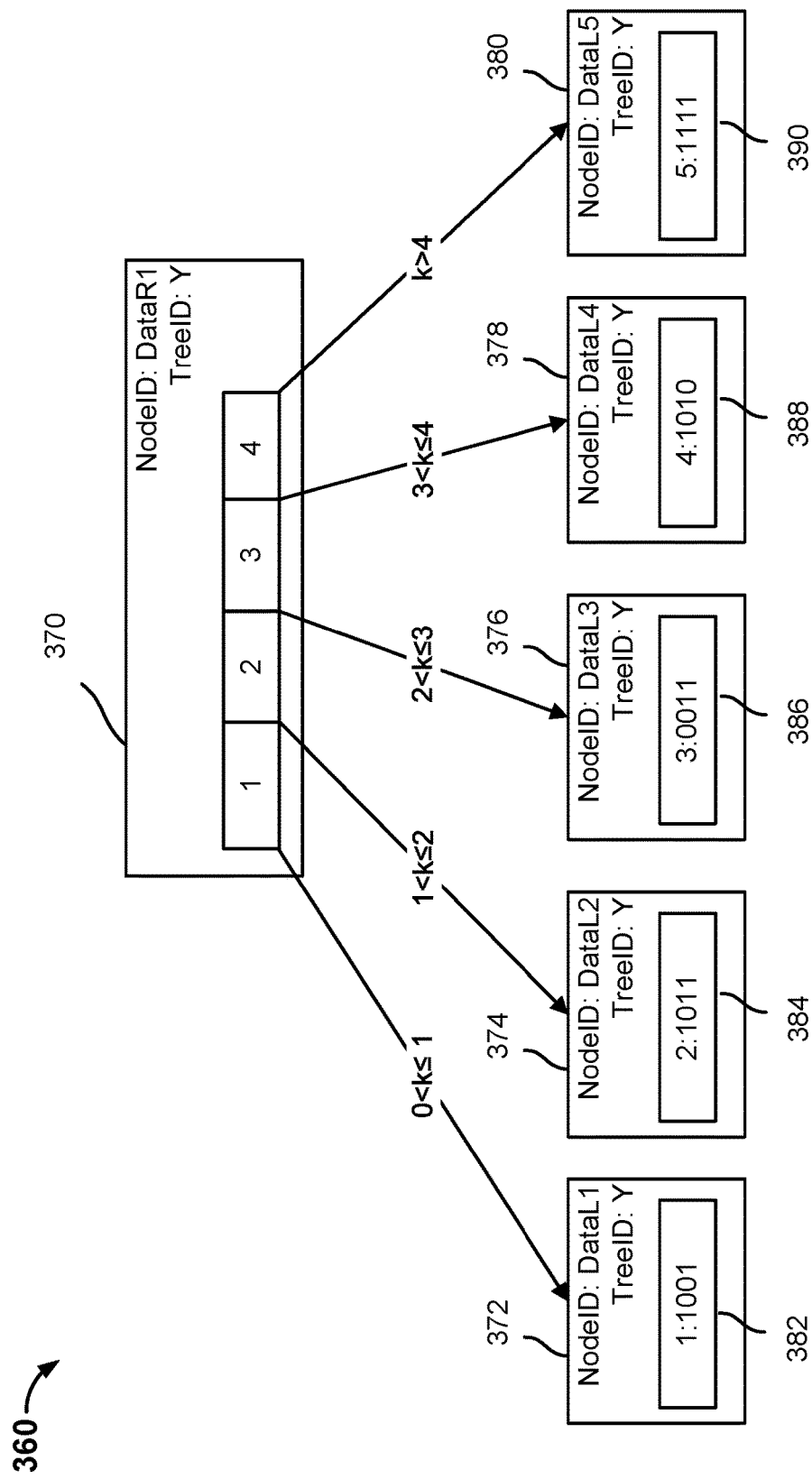
FIG. 3E is a block diagram illustrating an embodiment of a file snapshot tree.

FIG. 3E is a block diagram illustrating an embodiment of a file snapshot tree. In the example shown, a leaf node of a file system metadata snapshot tree, such as leaf node 322, 324, 326, 328, 330 may include a pointer to a file snapshot tree, such as file snapshot tree 360. A tree data structure may be used to store data related to a value associated with a leaf node. The file snapshot tree may store the contents of a file and/or metadata specific to the file. A file snapshot tree may be modified in a similar manner as depicted with respect to FIGS. 3B, 3C, and 3D.

In the example shown, file snapshot tree 360 includes a data root node 370 and data leaf nodes 372, 374, 376, 378, and 380. A file snapshot tree node may include one or more intermediate nodes, similar to the tree structure depicted in FIG. 3A. Data root node 370 includes a NodeID and a TreeID. Data root node 370 also includes a set of node keys. Data root node 370 includes a first node key of "1," a second node key of "2," a third node key of "3," and a fourth node key of "4." The data key k for data leaf node 372 is a value that is less than or equal to the first node key. Data leaf node 372 may include a data block 382 that stores bits of ones and zeros. Although data block 382 is depicted as storing the bit pattern "1001," a data block may store any bit pattern. Data leaf node 372 may include a pointer to a physical location that stores the data.

The data key k for data leaf node 374 is a value that is greater than the first node key and less than or equal the second node key. Data leaf node 374 includes a data block 384 that stores bits of ones and zeros. Although data block 384 is depicted as storing the bit pattern "1011," a data block may store any bit pattern. Data leaf node 374 may include a pointer to a physical location that stores the data.

The data key k for data leaf node 376 is a value that is greater than the second node key and less than or equal to the third node key. Data leaf node 376 includes a data block 386 that stores bits of ones and zeros. Although data block 386 is depicted as storing the bit pattern "0011," a data block may store any bit pattern. Data leaf node 376 may include a pointer to a physical location that stores the data.

The data key k for data leaf node 378 is a value that is greater than the third node key and less than or equal the fourth node key. Data leaf node 378 includes a data block 388 that stores bits of ones and zeros. Although data block 388 is depicted as storing the bit pattern "1010," a data block may store any bit pattern. Data leaf node 378 may include a pointer to a physical location that stores the data.

The data key k for data leaf node 380 is a value that is greater than the fourth node key. Data leaf node 380 includes a data block 390 that stores bits of ones and zeros. Although data block 390 is depicted as storing the bit pattern "1111," a data block may store any bit pattern. Data leaf node 390 may include a pointer to a physical location that stores the data.

Figure 4:
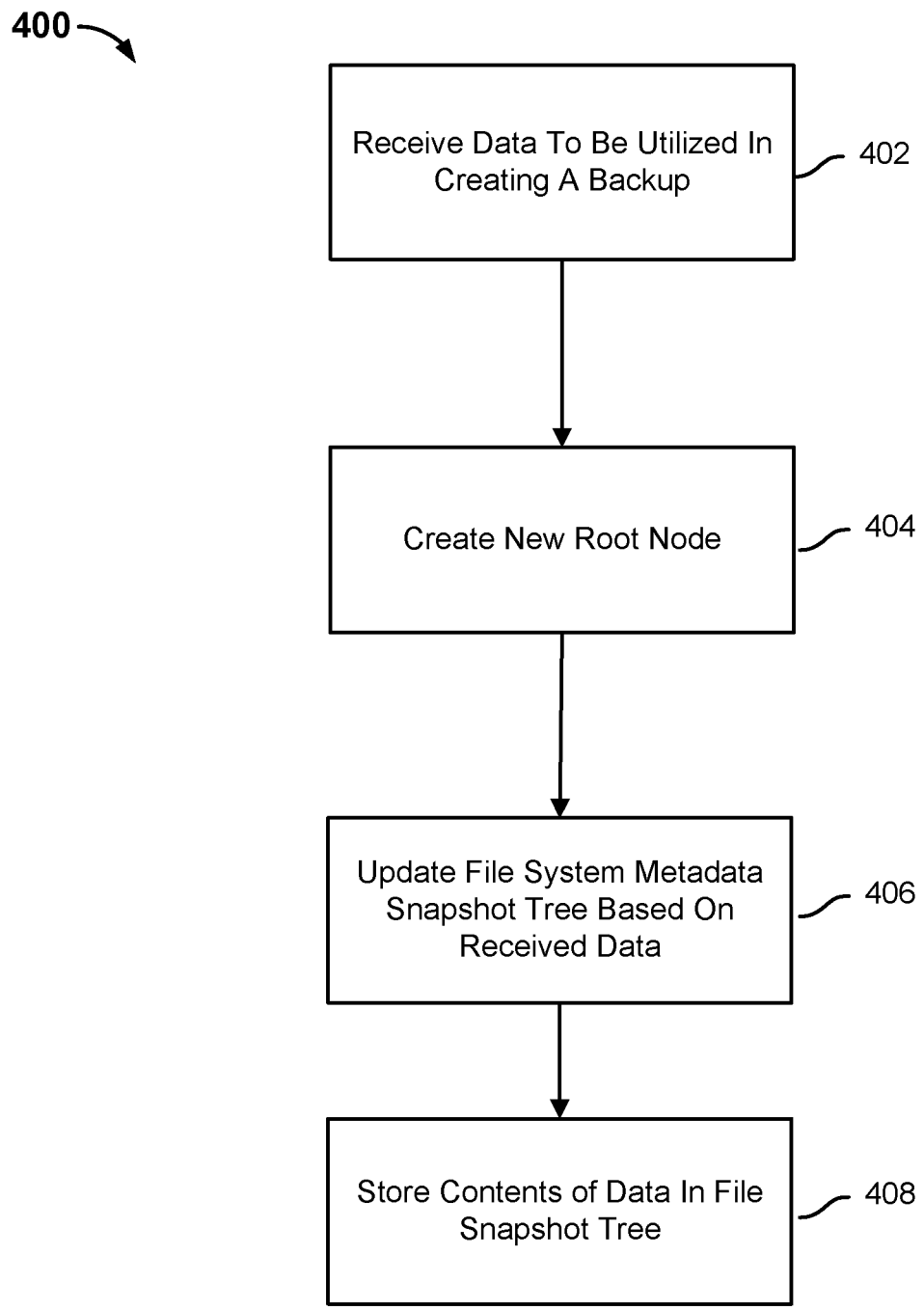
FIG. 4 is a flow chart illustrating an embodiment of a process for creating a file system metadata snapshot tree.

FIG. 4 is a flow chart illustrating an embodiment of a process for creating a file system metadata snapshot tree. In the example shown, process 400 may be implemented by a storage system, such as secondary storage system 112.

At 402, data to be utilized in creating a new backup instance is received from a primary system. The data may be received after a backup agent (e.g., backup agent 104) on the primary system initiates the creation of the new backup instance. The data associated with a backup includes data stored in the one or more storage volumes of the primary system. The backup may be a full backup or an incremental backup of the one or more storage volumes of the primary system. A full backup includes all of data that is included in the one or more storage volumes of the primary system. An incremental backup includes the data included in the one or more storage volumes that were not previously backed up since a previous backup.

Some of the data that is included in the backup may correspond to metadata associated with a database backup. Some of the data that is included in the backup may correspond to the data associated with a database. Some of the data that is included in the backup may correspond to non-database data.

At 404, a new root node corresponding to the new backup instance is created. The new root node may correspond to a new root node of a file system metadata snapshot tree. The new root node allows a file system metadata snapshot tree associated with the backup instance to be identified. The file system metadata tree data structure corresponds to a backup instance, that is, the file system metadata snapshot tree is a tree representation of the data associated with the one or more storage volumes included in the backup instance. The new root node may be linked to one or more nodes associated with a previous file system metadata snapshot tree. For example, as seen FIG. 3B, a new root node is added to a snapshot tree.

In some embodiments, the data associated with the new backup instance corresponds to a full backup. The data associated with the new backup instance represents the complete state of the one or more volumes of the primary system at the particular moment in time. The data associated with the new backup instance may be represented in a file system metadata snapshot tree. The file system metadata snapshot tree may be comprised of a root node, one or more levels of one or more intermediate nodes, and one or more leaf nodes.

In some embodiments, the data associated with the new backup instance corresponds to an incremental backup and includes database data that has not been previously backed up. For example, a new database may have been created on the primary system and the data associated with the new backup instance includes data corresponding to the new database. In such a scenario, the file system metadata snapshot tree may be modified to reflect the new database and one or more database file snapshot tree corresponding to the database files associated with the new database may be created. The file system metadata snapshot tree may be modified to include one or more leaf nodes such that each leaf node includes a pointer to one of the one or more database file snapshot trees.

In some embodiments, the data associated with the new backup instance corresponds to an incremental backup and includes database data that has been previously backed up, but the database data corresponds to previously stored database data that has been modified. In such a scenario, the file system metadata tree may be modified to reflect the modified database data and one or more associated database files may be modified to reflect the modified database data.

In some embodiments, at least a portion of the database metadata in 204 of FIG. 2 is associated with the new root node. For example, at least a portion of the database metadata is stored in the new root node and/or in separate data structure linked/associated with the new root node.

At 406, a file system metadata snapshot tree storing metadata associated with a database is updated based on the received data. For example, a file system metadata snapshot tree may be modified to include one or more new intermediate nodes and/or one or more leaf nodes. The pointers associated with the new root node and corresponding new intermediate nodes may be modified. The value associated with a leaf node of the file system metadata snapshot tree may be modified to reflect an updated value.

When the backup instance includes new data or modified data, a copy-on-write procedure is implemented. Creating a new root node of a file system metadata snapshot tree creates a copy of the file system metadata snapshot tree, i.e., a cloned file system metadata snapshot tree. The cloned file system metadata snapshot tree is traversed from the root node copy to the leaf node. The view identifier associated with each node along the path to the leaf node is inspected. In the event the view identifier associated with a node matches the view identifier associated with the root node copy, then the cloned file system metadata snapshot tree is traversed to the next node along the path. In the event the view identifier associated with a node does not match the view identifier associated with the root node copy, then a copy of the node with the non-matching view identifier is created. The copy of the node with the non-matching view identifier includes the same set of pointers as the copied node, but includes a different node ID and a view identifier of the new root node. A pointer of the node that pointed to the node with the non-matching view identifier is updated. The pointer is updated to point to the copy of the node with the non-matching view identifier instead of the node with the non-matching view identifier. The copy-on write process continues until the leaf node associated with the clone file system metadata snapshot tree is copied and modified.

For example, as seen in FIG. 3C, to modify the value "DATA4" of data key "4" to be the value "DATA4'," a new intermediate node 316 and a new leaf node 332 are added to the snapshot tree. When created, intermediate node 316 is a copy of intermediate node 314. However, among other differences, intermediate node 316 includes a different NodeID and the TreeID of root node 304. When created, new leaf node 332 is a copy of leaf node 328. However, among other differences, leaf node 332 includes a different NodeID and the TreeID of root node 304. A pointer associated with the root node 304 has been updated to point to the new intermediate node 316 instead of pointing to intermediate node 314. A pointer associated with intermediate node 316 has been updated to point to the new leaf node 332 instead of pointing to leaf node 328. The value associated with leaf node 332 has been modified from the value "DATA4" to be the value "DATA4'." The copy-on write procedure allows new leaf nodes to be associated with a particular root node, which is associated with a particular backup instance.

At 408, database contents of the received data is stored for the backup instance. The database contents may be stored using one or more corresponding database file snapshot trees. In some embodiments, as depicted in FIG. 3E, the database file snapshot tree is comprised of a root node and one or more leaf nodes. In other embodiments, as depicted in FIG. 3A, the database file snapshot tree is comprised of a root node, one or more levels of intermediate nodes, and one or more leaf nodes. A leaf node of the database file snapshot tree may store the database contents. In some embodiments, the leaf node of the database file snapshot tree also stores metadata specific to the database file. A leaf node of the database file snapshot tree may store a pointer to a storage location that stores the database contents. A leaf node of the file system metadata snapshot tree may include a pointer to the root node of a database file snapshot tree.

When the backup instance includes new or updated database contents, a new root node is added to the database file snapshot tree corresponding to the database. The new root node is a copy of the previous root node of the database file snapshot tree and includes the same set of pointers as the copied root node, but includes a different node ID and a different view identifier. The new root node creates a new database file snapshot tree that is linked to a previous database file snapshot tree. The new root node of the database file snapshot tree corresponds a version of the database associated with the backup instance.

When new database content is included in the backup instance, a new leaf node needs to be added to the new database file snapshot tree. A copy-on write procedure is implemented. The new database file snapshot tree is traversed from the root node copy to the lowest tiered intermediate node. The view identifier associated with each node along the path to the leaf node is inspected. In the event the view identifier associated with a node matches the view identifier associated with the root node copy, then the new database file snapshot tree is traversed to the next node along the path. In the event the view identifier associated with a node does not match the view identifier associated with the root node copy, then a copy of the node with the non-matching view identifier is created. The copy of the node with the non-matching view identifier includes the same set of pointers as the copied node, but includes a different node ID and a view identifier of the new root node. A pointer of the node that pointed to the node with the non-matching view identifier is updated. The pointer is updated to point to the copy of the node with the non-matching view identifier instead of the node with the non-matching view identifier. The copy-on write process continues until the lowest tiered intermediate node is reached. The lowest tiered intermediate node is modified to include a pointer to a new leaf node that corresponds to the new database content. In some embodiments, the new leaf node stores the database content. In other embodiments, the new leaf node stores a pointer to a storage location storing the database content.

When modified database content is included in the backup instance, a copy-on write procedure is implemented. The new database file snapshot tree is traversed from the root node copy to the leaf node that is to be modified. The view identifier associated with each node along the path to the leaf node is inspected. In the event the view identifier associated with a node matches the view identifier associated with the root node copy, then the new database file snapshot tree is traversed to the next node along the path. In the event the view identifier associated with a node does not match the view identifier associated with the root node copy, then a copy of the node with the non-matching view identifier is created. The copy of the node with the non-matching view identifier includes the same set of pointers as the copied node, but includes a different node ID and a view identifier of the new root node. A pointer of the node that pointed to the node with the non-matching view identifier is updated. The pointer is updated to point to the copy of the node with the non-matching view identifier instead of the node with the non-matching view identifier. The copy-on write process continues until the leaf node associated with the database file snapshot tree is copied and modified. In some embodiments, the leaf node stores the database content. In other embodiments, the leaf node stores a pointer to a storage location storing the database content.

Figure 5:
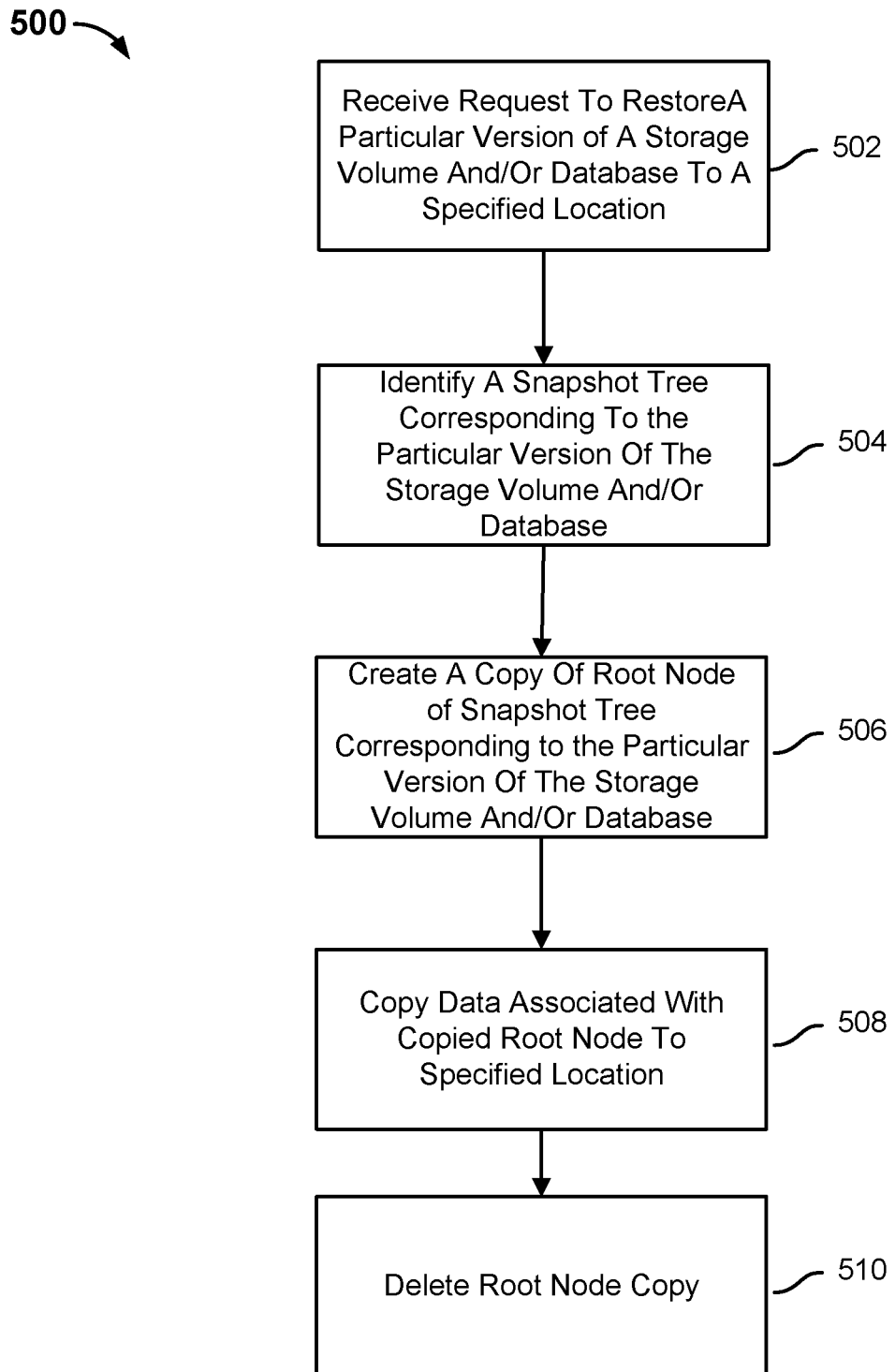
FIG. 5 is a flow chart illustrating an embodiment of a process for recovering a storage volume and/or a database to a specified location.

FIG. 5 is a flow chart illustrating an embodiment of a process for restoring a storage volume and/or a database to a specified location. In the example shown, process 500 may be implemented by a storage system, such as secondary storage system 112. The storage volume and/or database stored at the specified location may become corrupted and needs to be restored to a particular point in time. The storage system may provide disaster recovery for a system at the specified location.

At 502, a request to restore a particular version of a storage volume and/or a database to a specified location is received. In some embodiments, the request includes a request to restore a virtual machine. For example, the virtual machine and its database are to be restored by restoring a storage volume of the virtual machine. The specified location may be the original location that created the particular version of the database or an alternate location. The storage system may store a different versions of a storage volume and/or database. Each version of the database may be indexed at the storage system. For example, a request to recover a "foo" database will return each version of the "foo" database. Each backup instance, such as the backup instances received in FIG. 4 corresponds to a particular version of a storage volume.

At 504, a file system metadata snapshot tree corresponding to the particular version of the storage volume and/or database is identified. A particular storage volume may be identified by a timestamp associated with the particular storage volume. A particular version of a database may be identified based on database metadata stored at the storage system. The database metadata may indicate one or more database files to be restored that are associated with the particular version of the database. Each version of the storage volume is stored in a corresponding file system metadata snapshot tree.

At 506, a copy of the root node of the file system metadata snapshot tree corresponding to the particular version of the storage volume and/or database is created. For example, as depicted in FIG. 3B, a new root node corresponding to a new snapshot tree is added to a tree data structure. The new root node includes pointers to nodes associated with a previous snapshot tree. Creating a copy of the root node of the snapshot tree prevents the data associated with snapshot tree of the copied root node from being deleted while the database is being recovered to the specified site.

For example, a snapshot tree (file system metadata snapshot tree or file snapshot tree) may have an associated retention time policy associated with it. For example, retention time policy may indicate that a snapshot tree is to be deleted after a certain period of time (e.g., day(s), week(s), month(s), year(s), etc.). The retention time policy reduces the number of snapshot trees that a system is required to maintain and store in memory. In some embodiments, a retention time policy condition is satisfied (e.g., a snapshot tree has been stored in memory for a particular amount of time) and it is determined to remove the snapshot tree from memory. In the event the particular amount of time has passed, a file system manager may determine that the snapshot tree with the particular TreeID is to be removed from memory and/or storage. Each intermediate or leaf node has an associated count value. The count value indicates a number of nodes that point to a particular node. For example, the intermediate node 312 of FIG. 3A has a count value of "1" because root node 302 includes a pointer to the node. To remove a snapshot tree from memory, the root node of the snapshot tree is deleted. This may cause the count value associated with one or more nodes to decrement. In the event the count value associated with a node is "0," then the node is to be deleted. In the event the count node is greater than or equal to "1," then the node is to be kept. Creating a new root node by copying a root node increases the count value of the intermediate nodes pointed at by the copied root node because the new root node includes pointers to the intermediate nodes pointed at by the copied root node. When a policy condition is satisfied, the root node associated with the snapshot tree to be deleted, is deleted. This will cause the count value associated with the intermediate nodes to be decremented by "1," but because the new root node includes pointers to the intermediate nodes, the count value associated with the intermediate nodes will be greater than or equal to "1." This will prevent the data associated with the snapshot tree to be deleted, from being deleted.

At 508, data associated with the copied root node is copied to the specified location. The data associated with the copied root node may correspond to data associated with an entire storage volume. The data associated with the entire storage volume may be found by traversing the copied file system metadata snapshot tree from the copied root node to the leaf nodes and reading the leaf nodes of the copied file system metadata snapshot tree. The leaf nodes of the copied file system metadata snapshot tree may include pointers to one or more file snapshot trees. In the event the leaf nodes of the copied file system metadata include pointers to one or more file snapshot trees, the one or more file snapshot trees are traversed to determine the data associated with the one or more files. The data associated with the leaf nodes of the copied file system metadata snapshot tree and the data associated with the leaf nodes of the one or more file snapshot trees may be provided to the specified location.

The data associated with the copied root node may correspond to database data. The database data may be found by traversing the file snapshot trees associated with the particular version of the database. The file snapshot trees may correspond to a particular database file. The file snapshot trees may store the contents of a corresponding file and/or metadata specific to the corresponding file. The one or more database files included in a particular version of the database may be identified from database metadata stored at the secondary storage system. The leaf nodes of the file snapshot trees corresponding to database files included in a particular version of the database may store the data or a pointer to a storage location storing the data. After the database data has been identified and located, the database data may be copied to a volume associated with the specified location. In some embodiments, the database is set up on a system at the specified location. For example, the copied database data may include a setup agent to setup the database on the system at the specified location.

At 510, the root node copy is deleted after the data associated with the copied root node is successfully copied to the specified location. This will reduce the count value associated with nodes referenced by the root node copy and allow retention policies to be properly enforced.

Figure 6:
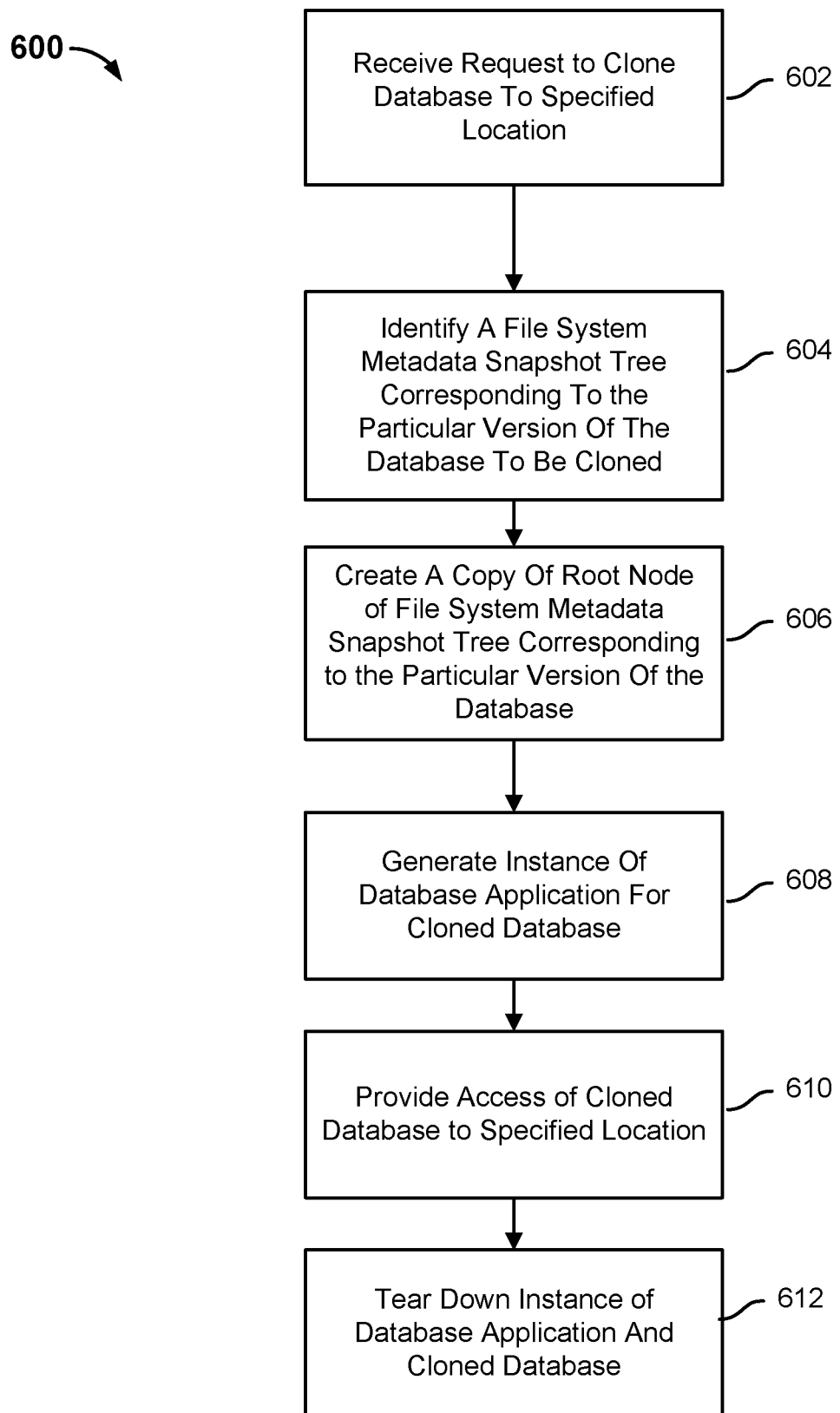
FIG. 6 is a flow chart illustrating an embodiment of a process for cloning a database.

FIG. 6 is a flow chart illustrating an embodiment of a process for cloning a database. In the example shown, process 600 may be implemented by a storage system, such as secondary storage system 112.

A database may be very large in size (e.g., terabytes) and a testing/development system may have limited storage available (e.g., gigabytes) to store the database. A user of the testing/development system may desire to run some queries on the database. Instead of transferring contents of an entire database to the testing/development system, a clone of a backup of the database may be created on the secondary storage system that already storing a copy of the database via its backup copy and the testing/development system is allowed access to the cloned copy on the separate secondary storage system. This allows the backup data to be used not only for backup purposes but also as live data for other purposes such as testing and development because changes made to the backup data from these other purposes are captured on the cloned copy of the backup data. This frees up storage of the testing/development system for other purposes and reduces the amount of time needed to run some queries on the database because the database data does not need to be transferred from the secondary storage system to the testing/development system. This also shields the integrity of the data stored at the secondary storage system because the user of the testing/development system is unable to modify any real versions of the database. Cloning a database allows the database to potentially be used as a backup and/or as a live test database.

At 602, a request to clone a database associated with a particular time to a specified location is received. The request may be received from a testing/development system.

At 604, a file system metadata snapshot tree corresponding to the particular version of the database to be cloned is identified. A particular version of a database may be identified based on database metadata stored at the storage system. The database metadata may indicate one or more database files associated with the particular version of the database. The database metadata may indicate a file system metadata snapshot tree associated with the particular version of the database.

At 606, a copy of the root node of the file system metadata snapshot tree corresponding to the particular version of the database to be cloned is created. The copied root node includes the set of pointers included in the previous root node, that is, the copied root node includes one or more pointers to an intermediate node or leaf node associated with a previous file system metadata snapshot tree. However, among other differences the copied root node includes a node identifier and a view identifier that is different than the node identifier and view identifier of the previous root node. For example, as depicted in FIG. 3B, a new root node corresponding to a new snapshot tree is added to a tree data structure. The new root node includes pointers to nodes associated with a previous snapshot tree. Copying the root node of the file system metadata snapshot tree prevents the data associated with file system metadata snapshot tree of the copied root node to be modified without having to worry about the data being accidentally modified and/or deleted. In some embodiments, the copy of the root node is one of a plurality of copies of the previous snapshot tree. For example, a fork is created in the china of snapshot trees where one branch is for the clone and another branch for subsequent backup instances.

At 608, an instance of a database application is generated for the cloned database. The instance of the database application is configured to access the database metadata and the one or more database files associated with the cloned database.

At 610, access of the cloned database is provided to the specified location. A testing/development system may access the cloned database via the instance of the database application running on the testing/development system. The testing/development system may perform a series of queries on the cloned database. Setting up and configuring the instance of the database application on the secondary storage system for the cloned database is faster than transferring the database data to the testing/development system and setting up the database on the testing/development system because a user of the testing/development system does not need to wait for the database data to be transferred and copied before the user can use the database clone. The user may be provided with near instant access (e.g. milliseconds, seconds, etc.) to the database clone.

The cloned database may be a current view of the database and is capable of being modified. For example, the file system metadata snapshot tree associated with the cloned database may undergo changes similar to the changes depicted in FIG. 3C.

At 612, the instance of the cloned database is deleted after its intended use. In some embodiments, 612 is optionally performed (e.g., the clone is to be persistent). A user may have made one or more modifications to the database such that one or more nodes have been added to the cloned file system metadata snapshot tree. To delete the cloned database, the root node of the cloned file system metadata snapshot tree is deleted. As a result, the count value associated with any node created as a result of the user modifications is decremented. The count value indicates a number of nodes that point to a particular node. Deleting the root node of the cloned file system metadata snapshot tree will decrement the count value associated with a node created as a result of the user's modifications to the database. In the event the count value of the nodes created as a result of the user's modification to the database is "0," the nodes are deleted. In some embodiments, the nodes created as a result of the user's modifications with a count value of "0" are deleted when the cloned database is teared down. In other embodiments, the nodes created as a result of the user's modifications with a count value of "0" are deleted when the retention time period associated with such nodes has expired.

Figure 7:
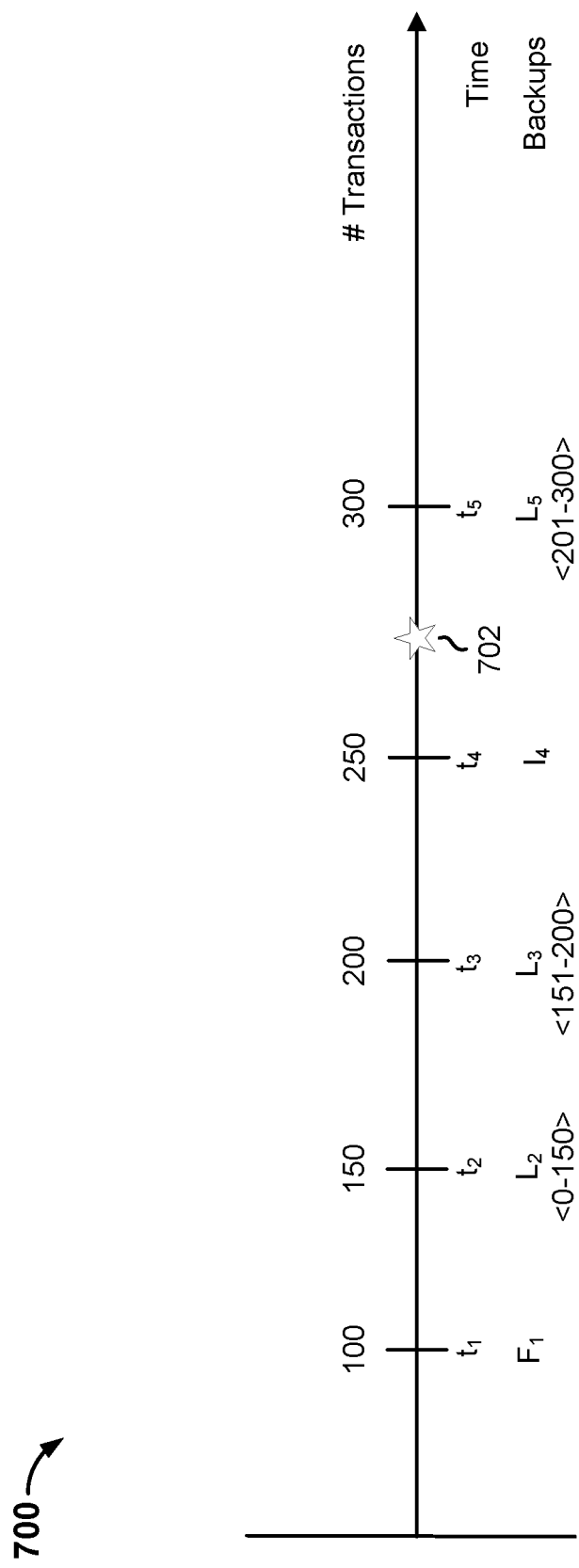
FIG. 7 is a block diagram illustrating an example of restoring a storage volume and/or a database to a particular point in time.

FIG. 7 is a block diagram illustrating an example of restoring a storage volume and/or a database to a particular point in time. Example 700 illustrates the number of database transactions and a plurality of backups with respect to a timeline. A storage system, such as secondary storage system may receive a request to restore a storage volume and/or a database to any particular point in time. The storage volume may be restored to any particular point in time as long as the storage system stores the necessary backups. For example, a storage volume may be restored to the state at $t_1$ or $t_4$ because the storage system stores full backup $F_1$ and incremental backup $I_4$. The database may be restored to any particular point in time as long as the storage system stores the necessary backups and one or more associated transaction log file segments. A backup includes a snapshot of a database at a particular moment in time. The backup represents the state of the database at the particular moment in time. A transaction log file segment stores the one or more modifications to a database (e.g., add node, copy node, delete node, modify node). Each modification is a transaction in the transaction log file.

In the example shown, time $t_1$ corresponds to the $100^{th}$ transaction of the database. At time $t_1$, a full backup $F_1$ of the database is stored to the storage system. The full backup $F_1$ represents the state of the database after 100 transactions. The storage system may restore the database to the state of the database at the $100^{th}$ transaction using only the full backup $F_1$.

A full backup of a storage volume is comprised of data corresponding to the storage volume at a particular point in time. The data corresponding to the storage volume at a particular point in time may be represented in a snapshot tree, such as the file system metadata snapshot tree depicted in FIG. 3A. The data corresponding to the storage volume includes data corresponding to the database at the particular point in time. The data corresponding to the database may be represented in a snapshot tree, such as the file snapshot tree depicted in FIG. 3E.

Time $t_2$ corresponds to the $150^{th}$ transaction of the database. At time $t_2$, a transaction log file segment $L_2$ is stored to the storage system. Transaction log file segment $L_2$ includes a record of transactions 0-150. The storage system may restore the database to the state of the database at any of the transactions between the $101^{st}$ transaction and the $150^{th}$ transaction using a combination of the full backup $F_1$ and the transaction log file segment $L_2$. The state of the database starts at the $100^{th}$ transaction via the full backup $F_1$ and each sequential modification stored in transaction log file segment $L_2$ is applied to the database until the database is restored to a specified moment in time. When a transaction is applied to the state of the database, a corresponding modification may be made to the file snapshot tree corresponding to the database to reflect the database at the particular transaction.

Time $t_3$ corresponds to the $200^{th}$ transaction of the database. At time $t_3$, a transaction log file segment $L_3$ is stored to the storage system. Transaction log file segment $L_3$ includes a record of transactions 151-200. The storage system may restore the database to the state of the database at any of the transactions between the $151^4$ transaction and the $200^{th}$ transaction using a combination of the full backup $F_1$, the transaction log file segment $L_2$, and the transaction log file segment $L_3$. The state of the database starts at the $100^{th}$ transaction via the full backup $F_1$, each sequential modification stored in transaction log file segment $L_2$ is applied to the database, and each sequential modification stored in transaction log file segment $L_3$ is applied to the database until the database is restored to a specified moment in time. When a transaction is applied to the state of the database, a corresponding modification may be made to the file snapshot tree corresponding to the database to reflect the database at the particular transaction.

Time $t_4$ corresponds to the $250^{th}$ transaction of the database. At time $t_4$, an incremental backup $I_4$ of the database is stored to the storage system. The incremental backup $I_4$ represents the state of the database after 250 transactions. The storage system may restore the database to the state of the database at the $250^{th}$ transaction using only the incremental backup $I_4$.

Due to the tree data structure described above, the file system metadata snapshot tree corresponding to the incremental backup is a fully hydrated backup because it provides a complete view of the storage volume, which includes the files associated with the database. As discussed above, a full backup of a storage volume is comprised of data corresponding to the database. The data corresponding to the database may be represented using a file system metadata snapshot tree, such as the snapshot tree depicted in FIG. 3A. A leaf node of the file system metadata snapshot tree may include a pointer to the file snapshot tree associated with the database. An incremental backup of a database is comprised of data corresponding to the data of the storage volume that was not previously backed up. The data of the storage volume that was not previously backed up may be represented in the file system metadata snapshot tree, such as the snapshot tree depicted in FIG. 3D. The file system metadata snapshot tree corresponding to the incremental backup may reference one or more nodes of a previous snapshot tree. For example, the snapshot tree depicted in FIG. 3D references one or more nodes of the snapshot tree depicted in FIG. 3A. The database data may be determined by traversing a file system metadata snapshot tree to a leaf node that includes a pointer to a database file snapshot tree and traversing the database file snapshot tree to determine the database data.

Time $t_5$ corresponds to the $300^{th}$ transaction of the database. At time $t_5$, a transaction log file segment $L_5$ is stored to the storage system. Transaction log file segment $L_5$ includes a record of transactions 201-300. The storage system may restore the database to the state of the database at any of the transactions between the $251^{st}$ transaction and the $300^{th}$ transaction using a combination of the incremental backup $I_4$ and the transaction log file segment $L_5$. The state of the database starts at the $250^{th}$ transaction via the incremental backup $I_4$ and each sequential modification stored in transaction log file segment $L_5$ is applied to the database until the database is restored to a specified moment in time. When a transaction is applied to the state of the database, a corresponding modification may be made to the file snapshot tree corresponding to the database to reflect the database at the particular transaction.

Suppose a request is received to restore a database to a particular moment in time represented by star 702. Because the incremental backup $I_4$ is a fully hydrated backup and provides a complete view of the database at the $250^{th}$ transaction, the database may be restored to the particular moment in time represented by star 702 by applying the corresponding modifications corresponding to the transactions stored in transaction log file segment $L_5$ to the file snapshot tree corresponding to the incremental backup at transaction 250. The state of the database does not need to start at the $100^{th}$ transaction via full backup $F_1$ and then subsequently apply the modifications stored in transaction log files segments $L_2$, $L_3$, $L_5$ to restore the database to the specified moment in time represented by star 702.

Figure 8:
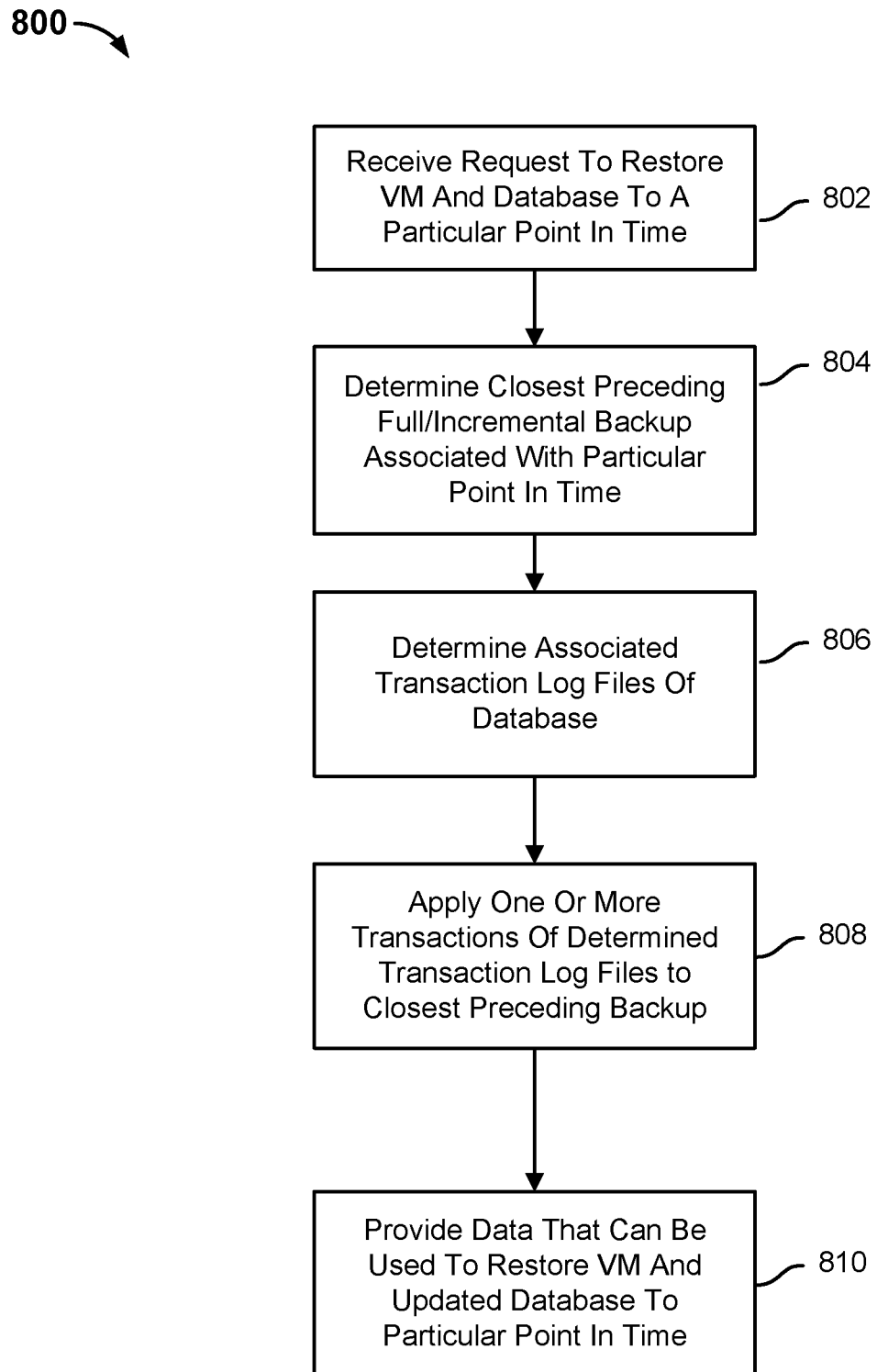
FIG. 8 is a flow chart illustrating an embodiment of a process for restoring an entire virtual machine and a database to any point in time.

FIG. 8 is a flow chart illustrating an embodiment of a process for restoring an entire virtual machine and a database to any point in time. In the example shown, process 800 may be implemented by a storage system, such as secondary storage system 112. A primary system may implement a virtual machine and a plurality of databases. Process 800 may be implemented by a storage system, such as secondary storage system 112 to restore the primary system to include the virtual machine and each of the plurality of databases to a particular point in time.

At 802, a request to restore a virtual machine and a database to a particular point in time is received. A system may go offline (e.g., the system has been infected with a virus, infected with malware, experienced a hardware failure, etc.). It may be desirable to restore the system and its associated database to a particular point in time that is a known consistent state.

A secondary storage system may receive a full or incremental backup from a primary system. The backup represents a state of the primary system at a particular point in time. The primary system may be restored to any state of the primary system for which a corresponding backup is stored at the secondary storage system. The database may be restored to any point in time for which a backup and corresponding transaction log files are stored at the secondary storage system. A transaction log file includes a sequence of transactions that are made with respect to a database. The backup may include one or more transaction log file segments. In some embodiments, the secondary storage system may receive one or more transaction log file segments separately from a backup. The transaction log file segment may be applied to a backup to modify the database to any transaction point for which there is an associated transaction log file segment stored on the secondary storage system. This allows the database to be restored to a particular point in time that does not exactly align to when a backup was created. Previous systems may be capable of restoring a storage volume to a particular point in time for which a backup is stored, but are unable to restore an associated database to a point in time between backups. A user of the system would manually perform the transactions to the database to update the database to the particular point in time between backups. Performing the transactions to the database before providing the restored storage volume and database, as disclosed herein, reduces the amount of time to restore the database to the particular point in time between backups.

At 804, the closest preceding full or incremental backup associated with the particular point in time is determined. The closest preceding full or incremental backup includes file system metadata, data associated with non-database data, data associated with the database and/or database metadata. The closest preceding full or incremental backup corresponds to a particular transaction of the database at the time of backup. The storage system stores a file system metadata snapshot tree corresponding to the closest backup associated with the particular point in time and a database file snapshot tree corresponding to the data associated with the database of the closest preceding full/incremental backup. The storage system also stores database metadata associated with the closest preceding full/incremental backup. Metadata associated with the database may indicate one or more files associated with the version of the database to be recovered. Metadata associated with the database may indicate the file system metadata snapshot tree corresponding to the version of the database to be recovered. The file system metadata snapshot tree corresponding to the particular point in time is a representation of a fully hydrated backup because it provides a complete view of the storage volume and database data at the particular point in time. In some embodiments, an entire virtual machine and a database is restored to any point in time for a plurality of systems. To restore the plurality of systems to a common state, the closest full or incremental backup associated with the particular point in time that is shared between the plurality of systems is determined.

At 806, one or more associated transaction log file segments of the database are identified. The one or more associated transaction log file segments include a record of transactions performed to the database that occurred after the particular transaction of the database associated with the closest preceding backup. For example, as seen in FIG. 7, transaction log file segment $L_5$ is an associated transaction log file segment to restore a database to the particular moment in time represented by star 702 because the transactions stored in transaction log file segment $L_5$ are needed to be applied to incremental backup $I_4$ to restore the database to the particular moment in time represented by star 702. In contrast, transaction log file segments $L_2$, $L_3$ are not needed to restore the database to the particular moment in time represented by star 702 because the store transactions that occurred before the transaction associated with the incremental backup.

At 808, the one or more transactions of the identified one or more transaction log files are applied to the closest preceding backup by a file system manager of the secondary storage system. To restore the database to the particular point in time between backups, the one or more transactions that occur after the particular transaction of the transaction log file segment corresponding to the backup are applied to the backup. The one or more transactions are applied until the transaction corresponding to the particular point in time. A transaction may correspond to a modification to the file system metadata snapshot tree. A leaf node of the file system metadata snapshot tree may include a pointer to a database file snapshot tree. The database file snapshot tree is subtree of the file system metadata snapshot tree. A leaf node of the database file snapshot tree may include a pointer to a storage location associated with a portion of the database file. In the event a transaction of the transaction log file is a query request, the file system metadata snapshot tree is unchanged. In the event a transaction of the transaction log file is a database file modification, a corresponding modification is made to the file system metadata snapshot tree and/or one of the database file snapshot trees.

For example, in the event a data value of the database has been modified, a copy-on-write procedure is implemented. A file system metadata snapshot tree corresponding to the closest backup before the particular point in time is identified. A copy of the file system metadata snapshot tree is created by copying the root node of the file system metadata snapshot tree. The root node copy of the file system metadata snapshot tree includes the same set of pointers as the root node of the file system metadata snapshot tree, but includes a different node ID and view identifier. A copy of the root node associated with the database file snapshot tree corresponding to the database file is also created. A pointer of a leaf node of the file system metadata snapshot tree that pointed to the root node of the database file snapshot tree is updated to point to the root node copy of the root node associated with the database file snapshot tree corresponding to the database file instead of pointing to the root node associated with the database file snapshot tree corresponding to the database file.

The root node copy of the root node associated with the database file snapshot tree corresponding to the database file includes the same set of pointers as the root node associated with the database file snapshot tree corresponding to the database file. However, among other differences, it includes a different node ID and a different view identifier. The cloned database file snapshot tree is traversed from the root node copy of the database file snapshot tree corresponding to the database file to the leaf node to be modified. The view identifier associated with each node along the path to the leaf node is inspected. In the event the view identifier associated with a node matches the view identifier associated with the root node copy of the cloned database file snapshot tree, then the cloned database file snapshot tree is traversed to the next node along the path. In the event the view identifier associated with a node does not match the view identifier associated with the root node copy, then a copy of the node with the non-matching view identifier is created. The copy of the node with the non-matching view identifier includes the same set of pointers as the copied node, but includes a different node ID and a view identifier of the copied node. A pointer of the node that pointed to the node with the non-matching view identifier is updated. The pointer is updated to point to the copy of the node with the non-matching view identifier instead of the node with the non-matching view identifier. The copy-on write process continues until the leaf node associated with the clone file system metadata snapshot tree is copied and modified. The leaf node may be modified to point to a different location of the storage system.

At 810, data that can be used to restore the entire virtual machine and the updated database to the particular point in time is provided. After the cloned file system metadata snapshot tree and the corresponding cloned database file snapshot trees have been modified such that the cloned file system metadata snapshot tree and the corresponding cloned database file snapshot trees correspond to the database at the particular point in time, the entire cloned storage volume may be provided to a specified location. Upon receiving and storing the entire cloned storage volume, the specified location has been updated to include an entire volume corresponding to the closest preceding backup and a restored database corresponding to the particular moment in time. After the entire volume and database has been successfully recovered to the specified location, the root node copy of the root node of file system metadata snapshot tree corresponding to the closest backup before the particular point in time and the root node copy of the root node associated with the database file snapshot tree corresponding to the database file are deleted. In some embodiments, deleting the root node copies will also delete any nodes added to the cloned snapshot trees.

Figure 9A:
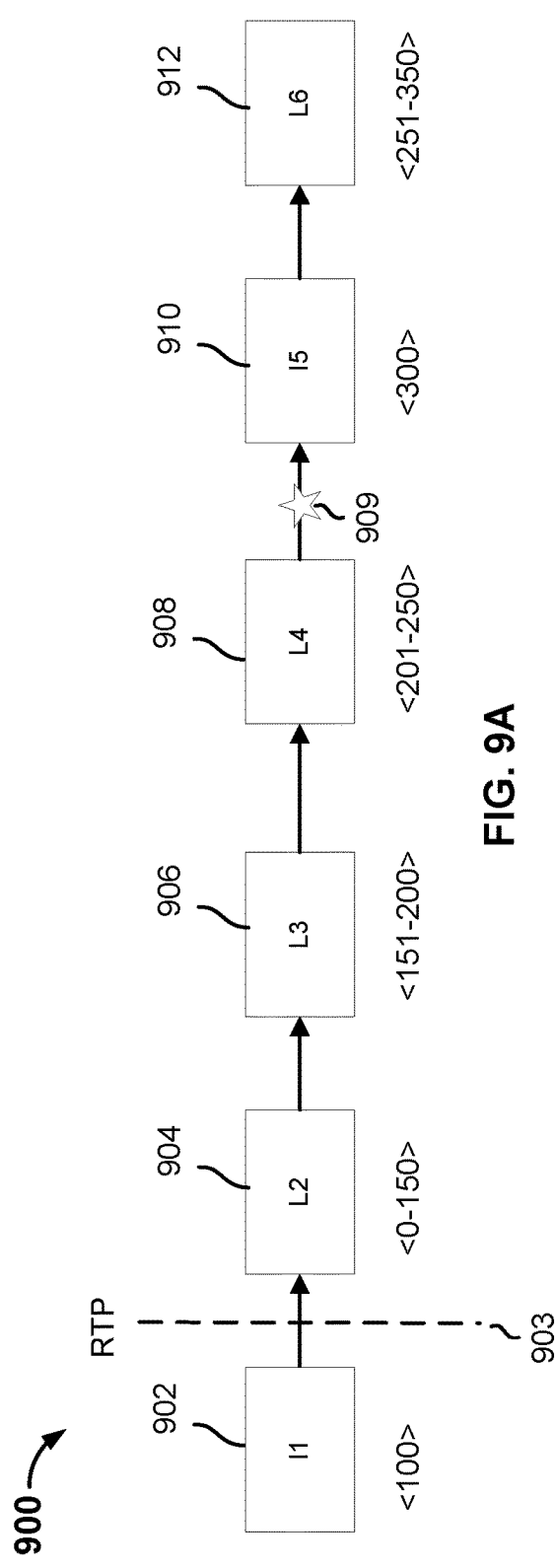
FIG. 9A is a block diagram illustrating a retention time period being applied to instances of backup data.

FIG. 9A is a block diagram illustrating a retention time period being applied to instances of backup data. The backup data may include a full backup, an incremental backup, or a transaction log file segment. Each instance of backup data has a corresponding creation date and a corresponding retention time. In the event the corresponding retention time has passed, then under normal circumstances, the instance of backup data is to be deleted. However, in some embodiments, deleting an instance of backup data prevents the database from being restored to particular moments in time that are within the retention time period.

In the example shown, retention time period 903 is being applied to a database. For example, a retention time period may be 30 days. Any instance of backup data to the left of the retention time period 903 indicates that the instance of backup data is past the retention time period. For example, any instance of data that was created more than 30 days from the current time is past the retention time period. Any instance of backup data to the right of the retention time period 903 indicates that the instance of backup data is within the retention time period. For example, any instance of data that was created within the past 30 days is within the retention time period. In the example shown, incremental backup 902 is past the retention time period. Transaction log file segments 904, 906, 908, 912 and incremental backup 910 is within the retention time period.

Incremental backup 902 represents the state of the database at the $100^{th}$ transaction. Transaction log file segment 904 stores a record of transactions 0-150 that were applied to the database. The database may be restored to any transaction between transactions 100-150 by applying transaction log file segment 904 to incremental backup 902. Transaction log file segment 906 stores a record of transactions 151-200 that were applied to the database. The database may be restored to any transaction between transactions 151-200 by applying transaction log file segment 904 and transaction log file segment 906 to incremental backup 902. Transaction log file segment 908 stores a record of transactions 201-250 that were applied to the database. The database may be restored to any transaction between transactions 151-200 by applying transaction log file segment 904, transaction log file segment 906, and transaction log file segment 908 to incremental backup 902. Transaction log file segment 912 stores a record of transactions 251-350 that were applied to the database. The database may be restored to any transaction between transactions 251-350 by applying transaction log file segment 904, transaction log file segment 906, and transaction log file segment 908 to incremental backup 902. Incremental backup 910 represents the state of the database at the $300^{th}$ transaction. Transaction log file segment 912 stores a record of transactions 251-350 that were applied to the database. The database may be restored to any transaction between transactions 301-350 by applying transaction log file segment 912 to incremental backup 910.

In the example shown, a request is received to restore the database to a particular moment in time represented by star 909. In some embodiments, star 909 corresponds to the $225^{th}$ transaction of the database. To restore the database to the $225^{th}$ transaction, the state of the database via incremental backup 902 is the state of the database at the $100^{th}$ transaction. Transaction log file segment 904 may be applied to the incremental backup 902 to restore the database to the $150^{th}$ transaction. Transaction log file segment 906 may be applied to the modified database to restore the database to the $200^{th}$ transaction. Transactions 201-225 of transaction log file segment 908 may be applied to the modified database to restore the database to the $225^{th}$ transaction. If incremental backup 902 was deleted from the storage system, then the storage system would be unable to restore the database to the particular moment in time represented by star 909.

Figure 9B:
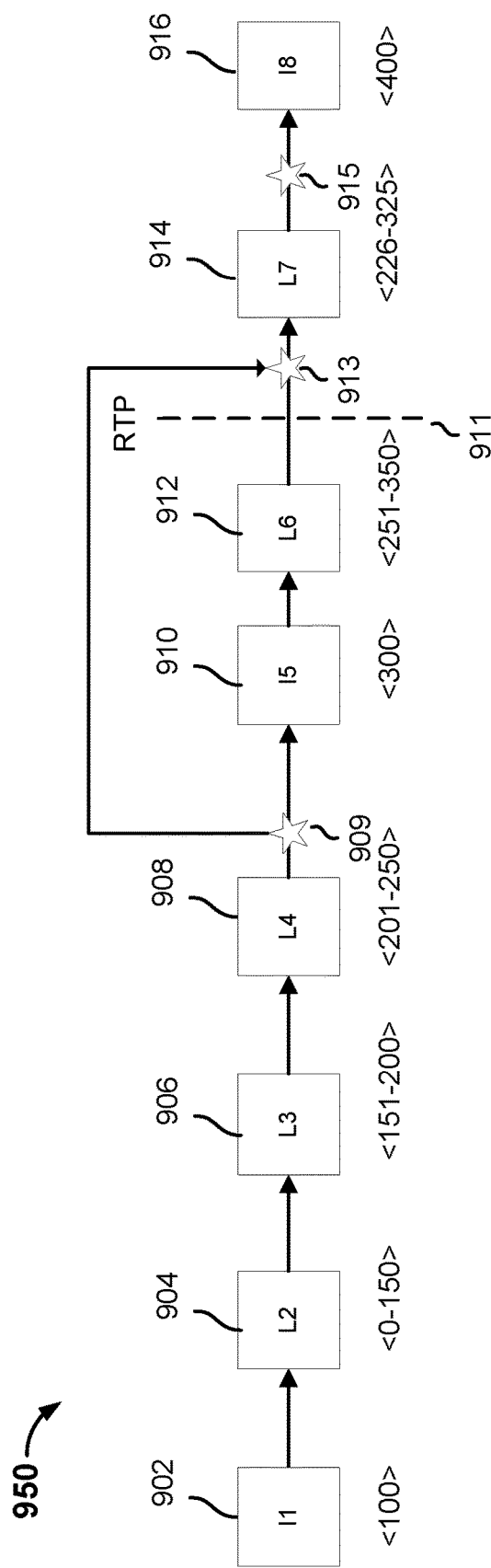
FIG. 9B is a block diagram illustrating a retention time period being applied to instances of backup data.

FIG. 9B is a block diagram illustrating a retention time period being applied to instances of backup data. The backup data may include a full backup, an incremental backup, or a transaction log file segment. Each instance of backup data has a corresponding creation date and a corresponding retention time period. In the event the corresponding retention time period has passed, then under normal circumstances, the instance of backup data is to be deleted. However, in some embodiments, deleting an instance of backup data prevents the database from being restored to particular moments in time that are within the retention time period.

In the example shown, retention time period 911 is being applied to a database. For example, a retention time period may be 30 days. Any instance of backup data to the left of the retention time period 911 indicates that the instance of backup data is past retention time period 911. For example, any instance of data that was created more than 30 days from the current time is past the retention time period. Any instance of backup data to the right of the retention time period 911 indicates that the instance of backup data is within the retention time period 911. For example, any instance of data that was created within the past 30 days is within the retention time period 911. In the example shown, incremental backups 902, 910 and transaction log files segments 904, 906, 908, 912 are past the retention time period 911. Transaction log file segment 914 and incremental backup 910 are within the retention time 911.

Incremental backup 902 represents the state of the database at the $100^{th}$ transaction. Transaction log file segment 904 stores a record of transactions 0-150 that were applied to the database. The database may be restored to any transaction between transactions 100-150 by applying transaction log segment 904 to incremental backup 902. Transaction log file segment 906 stores a record of transactions 151-200 that were applied to the database. The database may be restored to any transaction between transactions 151-200 by applying transaction log file segment 904 and transaction log file segment 906 to incremental backup 902. Transaction log file segment 908 stores a record of transactions 201-250 that were applied to the database. The database may be restored to any transaction between transactions 151-200 by applying transaction log file segment 904, transaction log file segment 906, and transaction log file segment 908 to incremental backup 902. Transaction log file segment 912 stores a record of transactions 251-350 that were applied to the database. The database may be restored to any transaction between transactions 251-350 by applying transaction log file segment 904, transaction log file segment 906, and transaction log file segment 908 to incremental backup 902. Incremental backup 910 represents the state of the database at the $300^{th}$ transaction. Transaction log file segment 912 stores a record of transactions 251-350 that were applied to the database. The database may be restored to any transaction between transactions 301-350 by applying transaction log file segment 912 to incremental backup 910.

Star 913 represents the database after the database was restored to the particular point in time represented by star 909. In some embodiments, star 913 and star 909 correspond to the $225^{th}$ transaction of the database. Transaction log file segment 914 corresponds to the database transactions made after the database was restored to the particular point in time represented by star 909. Transaction log file segment 914 includes a record of transactions 226-325 made to the database. Transaction log file segment 908 includes a record of transactions 201-250 and transaction log file segment 912 includes a record of transactions 251-350. The transaction numbers that overlap between transaction log file segment 914 and transaction log files 908, 912 are transactions 226-325. Although the transaction numbers may overlap, the actual transactions may be different. Star 915 represents the state of the database at a particular transaction. For example, star 915 may represent the state of the database at the $310^{th}$ transaction. The database may be restored to the point in time represented by star 915 via incremental backup 902 and applying transaction log file segment 904, transaction log file segment 906, a portion of transaction log file segment 908 (e.g., transactions 201-225), and a portion of transaction log file segment 914 (e.g., transactions 226-310). Restoring the database to the particular point in time represented by star 915, i.e., the $310^{th}$ transaction, will restore the database to a different state than restoring the database to the $310^{th}$ transaction via incremental backup 910 and transaction log file segment 912 or via incremental backup 902 and log incremental files 904, 906, 908, 912 because the overlapping transactions 226-310 between Transaction log file segment 914 and transaction log files 908, 912 are not necessarily the same. Thus, two different versions of the database at the $310^{th}$ transaction exist.

In the example shown, a request is received to restore the database to a particular moment in time represented by star 915. In some embodiments, star 915 corresponds to the $310^{th}$ transaction of the database. To restore the database to the $310^{th}$ transaction, the state of the database via incremental backup 902 is the state of the database at the $100^{th}$ transaction. Transaction log file segment 904 may be applied to the incremental backup 902 to restore the database to the $150^{th}$ transaction. Transaction log file segment 906 may be applied to the modified database to restore the database to the $200^{th}$ transaction. Transactions 201-225 of transaction log file segment 908 may be applied to the modified database to restore the database to the $225^{th}$ transaction. Transactions 226-310 of transaction log file segment 914 may be applied to the modified database to restore the database to the $310^{th}$ transaction. As seen in FIG. 9B, incremental backups 902, 910 and transaction log file segments 904, 906, 908, 912 are past retention time period 911. The database may be restored to $310^{th}$ transaction via incremental backup 910 and transaction log file segment 912, however, that version of the database is not the current version of the database. If incremental backup 902 and transaction log file segments 904, 906, 908 were deleted from the storage system, then the storage system would be unable to restore the database to the particular moment in time represented by star 915. Incremental backup 910 and 912 may be deleted from the storage system because those instances of backup data are past the retention time period and not needed to restore the database to an instance of backup data that is within the retention time period. However, incremental backup 902 and transaction log file segments 904, 906, 908 may not be deleted from the storage system because even though those instances of backup data are past the retention time period, they are needed to restore the database to an instance of backup data that is within the retention time period.

Figure 9C:
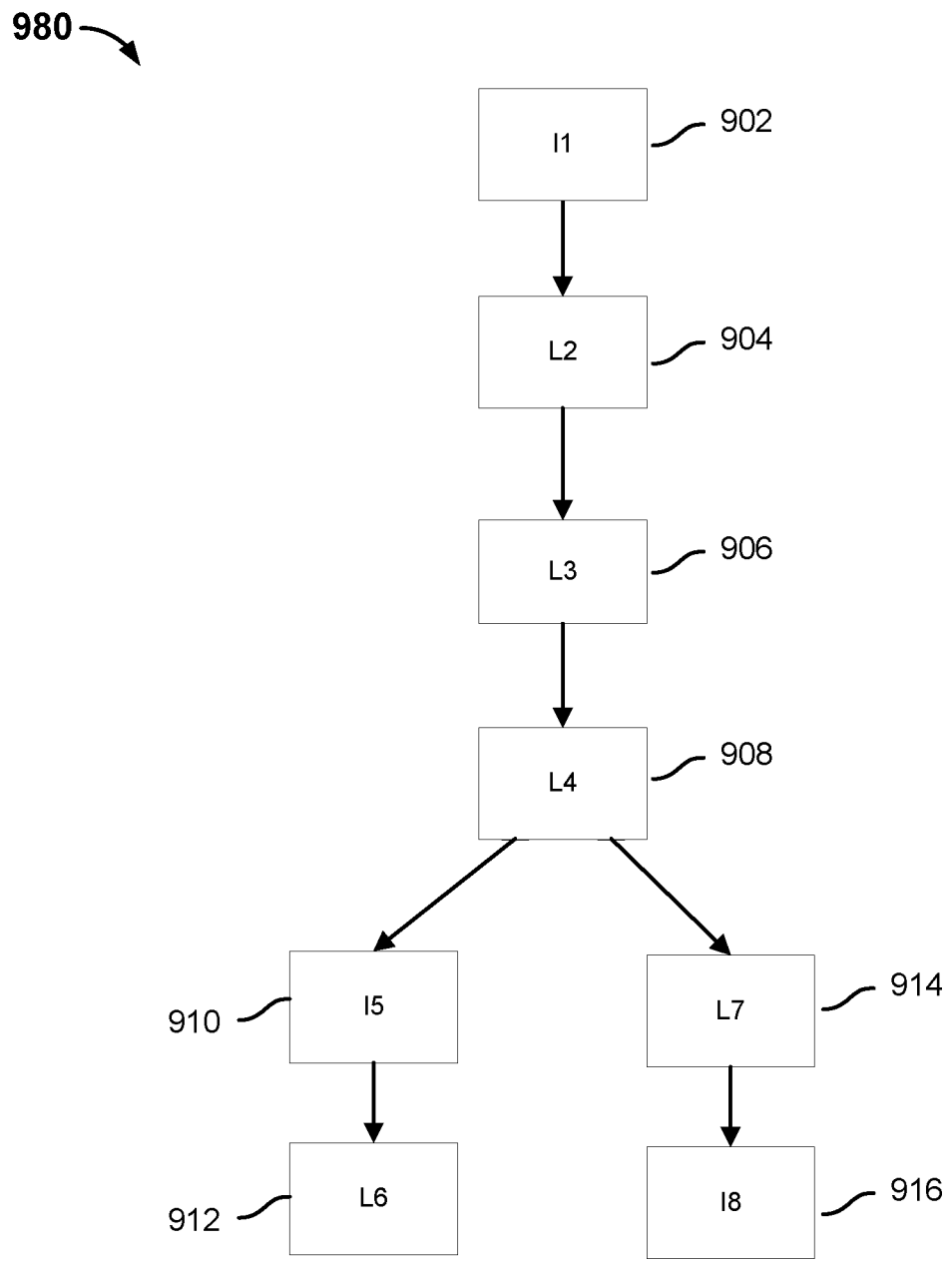
FIG. 9C is a block diagram illustrating a tree representation of instances of backup data.

FIG. 9C is a block diagram illustrating a tree representation of instances of backup data. In the example shown, the tree representation 980 is a representation of the instances of backup data from FIG. 9B. Tree representation 980 includes incremental backup 902, transaction log file segment 904, transaction log file segment 906, transaction log file segment 908, incremental backup 910, transaction log file segment 912, transaction log file segment 914, and incremental backup 916.

Incremental backup 902 represents the state of the database at the $100^{th}$ transaction. Transaction log file segment 904 corresponds to database transactions 0-150. Transaction log file segment 906 corresponds to database transactions 151-200. Transaction log file segment 906 corresponds to database transactions 151-200. Transaction log file segment 908 corresponds to database transactions 201-250. Incremental backup 910 represents the state of the database at the $300^{th}$ transaction. Transaction log file segment 912 corresponds to database transactions 251-350. Transaction log file segment 914 corresponds to database transactions 226-325 after the database was restored to the $225^{th}$ transaction. Incremental backup 916 represents the state of the database at the $400^{th}$ transaction after the database was restored to the $225^{th}$ transaction.

As seen in tree representation 980, different versions of the database may exist after the database is restored to a particular moment in time. In some embodiments, an instance of backup data may be marked as "delete" in the event instance of data is past the retention time period. For example, with respect to retention time period 911, incremental backups 902, 910 and transaction log file segments 904, 906, 908, 912 may be marked as deleted. Transaction log file segment 914 and incremental backup 916 are within the retention time period. Since incremental backup 902 and transaction log file segments 904, 906, 908 are needed to restore the database to any transaction associated with transaction log file segment 914, incremental backup 902 and transaction log file segments 904, 906, 908 may be unmarked as "delete" and marked as "keep." Since incremental backup 910 and transaction log file segment 912 are not needed to restore the database to any transaction associated with transaction log file segment 914, those instances of backup data may be deleted.

Figure 10:
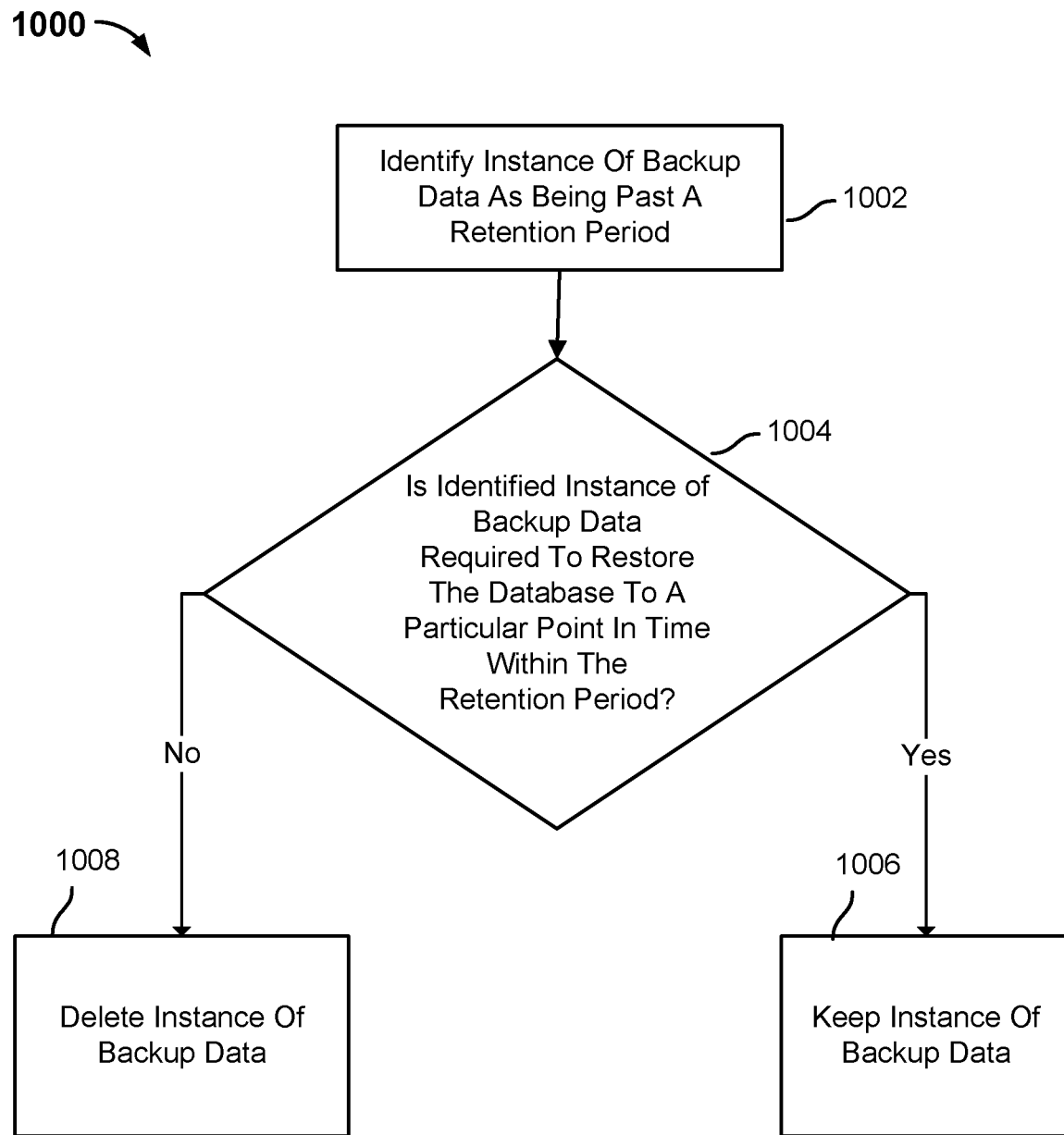
FIG. 10 is a flow chart illustrating an embodiment of a process for maintaining backups.

FIG. 10 is a flow chart illustrating an embodiment of a process for maintaining backups. In the example shown, process 1000 may be performed by a storage system, such as secondary storage system 112. Process 1000 may be performed when a retention time period associated with a node has expired.

At 1002, an instance of backup data is identified as being past a retention time period. The instance of backup data may be a full backup, an incremental backup, or a transaction log file segment. Each instance of backup data has a corresponding creation date and a corresponding retention time period. For example, the corresponding retention time period may indicate that an instance of backup data is to be deleted after a certain period of time has passed since the corresponding creation date (e.g., delete instance of data 30 days after creation date).

For example, as seen in FIG. 9A, incremental backup 902 is identified as being past retention time period 903. As seen in FIG. 9B, incremental backups 902, 910 and transaction log file segments 904, 906, 908, 912 are identified as being past retention time period 911.

At 1004, it is determined whether the identified instance of backup data is required to restore the database to a particular point in time within the retention time period. An instance of data may be required to restore the database to a particular point in time within the retention time period in the event an instance of data within the retention time period directly or indirectly references an instance of data that is past the retention time period. For example, an instance of data may be required to restore the database to a particular time if the instance of data is the first backup instance outside the retention period and/or before a restore point. An instance of data may be required to restore the database to a particular time if the instance of data is directly or indirectly referenced by an instance of data that is within the retention time period. As seen in FIG. 9A, incremental backup 902 is required to restore the database to the particular moment in time represented by star 909. As seen in FIGS. 9B and 9C, the instance of backup data, transaction log file segment 914, directly references transaction log file segment 908 and indirectly references incremental backup 902 and transaction log files 904 and 906. The instance of backup data, transaction log file segment 914, does not reference incremental backup 910 and transaction log file segment 912.

In the event the identified instance of backup data is required, then process 1000 proceeds to 1006 and the instance of backup data is kept. In the event the identified instance of backup data is not required, then process 1000 proceeds to 1008 and the instance of backup data is deleted.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    determining to perform a backup of a database;
    performing a backup of at least a portion of contents of a storage volume that includes data of the database, including by creating a new metadata tree root node, wherein creating the new metadata tree root node includes copying from another metadata tree root node of a tree data structure corresponding to a previous backup instance, one or more references to one or more lower tier metadata tree nodes associated with the tree data structure corresponding to the previous backup instance;
    receiving one or more transaction log file segments, wherein the one or more transaction log file segments are comprised of a plurality of transactions associated with the database;
    identifying the backup as being past a retention time period;
    determining whether to delete the backup based on whether the backup is needed to restore the database to a point in time corresponding to one of the plurality of transactions associated with the database, wherein the one of the plurality of transactions associated with the database occurs within the retention time period; and
    modifying a file system metadata snapshot tree associated with a requested particular version based on the one or more transaction log file segments associated with the database, wherein the requested particular version is associated with a particular point in time.

2. The method of claim 1, further comprising traversing the tree data structure from the new metadata tree root node to provide a complete view of file system metadata for a version of the storage volume.

3. The method of claim 1, wherein the backup of the database is determined to be performed in response to receiving the storage volume that includes the data of the database.

4. The method of claim 1, wherein the database is prepared to be backed up prior to performing the backup.

5. The method of claim 1, wherein the database is prepared to be backed up at least in part by quiescing a database application associated with the database.

6. The method of claim 1, wherein the at least a portion of contents of the storage volume includes metadata associated with the database.

7. The method of claim 1, wherein performing the backup of at least the portion of contents of the storage volume that includes data of the database includes tracking one or more changes by adding one or more new leaf nodes and one or more new intermediate nodes, wherein the one or more new leaf nodes and the one or more new intermediate nodes are linked to the new metadata tree root node.

8. The method of claim 1, further comprising:
    determining the file system metadata snapshot tree associated with the requested particular version; and
    creating a copy of a root node of the file system metadata snapshot tree associated with the requested particular version.

9. The method of claim 8, further comprising copying data associated with the root node copy to a specified location.

10. The method of claim 9, further comprising deleting the root node copy.

11. The method of claim 8, further comprising providing access to data associated with the root node copy.

12. The method of claim 1, further comprising providing data associated with the modified file system metadata snapshot tree and the portion of the contents of the storage volume associated with the particular point in time.

13. The method of claim 1, wherein the contents of the storage volume is associated with a full backup or an incremental backup of a source of the storage volume contents.

14. The method of claim 1, further comprising, deleting the backup based on whether the backup is required to restore the database to the particular point in time.

15. A system, comprising:
    a processor configured to:
        determine to perform a backup of a database;
        perform a backup of at least a portion of contents of a storage volume that includes data of the database, wherein to perform the backup of at least a portion of contents of the storage volume that includes data of the database includes to create a new metadata tree root node, wherein to create the new metadata tree root node includes copying from another metadata tree root node of a tree data structure corresponding to a previous backup instance, one or more references to one or more lower tier metadata tree nodes associated with the tree data structure corresponding to the previous backup instance;
        receive one or more transaction log file segments, wherein the one or more transaction log file segments are comprised of a plurality of transactions associated with the database;
        identify the backup as being past a retention time period;
        determine whether to delete the backup based on whether the backup is needed to restore the database to a point in time corresponding to one of the plurality of transactions associated with the database, wherein the one of the plurality of transactions associated with the database occurs within the retention time period;
        modify a file system metadata snapshot tree associated with a requested particular version based on the one or more transaction log file segments associated with the database, wherein the requested particular version is associated with a particular point in time; and
    a memory coupled to the processor and configured to provide the processor with instructions.

16. A computer program product, the computer program product being embodied in a non-transitory computer readable storage medium and comprising computer instructions for:
    determining to perform a backup of a database;
    performing a backup of at least a portion of contents of a storage volume that includes data of the database, including by creating a new metadata tree root node, wherein creating the new metadata tree root node includes copying from another metadata tree root node of a tree data structure corresponding to a previous backup instance, one or more references to one or more lower tier metadata tree nodes associated with the tree data structure corresponding to the previous backup instance;

receiving one or more transaction log file segments, wherein the one or more transaction log file segments are comprised of a plurality of transactions associated with the database;

identifying the backup as being past a retention time period;

determining whether to delete the backup based on whether the backup is needed to restore the database to a point in time corresponding to one of the plurality of transactions associated with the database, wherein the one of the plurality of transactions associated with the database occurs within the retention time period; and modifying a file system metadata snapshot tree associated with a requested particular version based on the one or more transaction log file segments associated with the database, wherein the requested particular version is associated with a particular point in time.

* * * * *